(12) United States Patent
Choi et al.

(10) Patent No.: US 11,285,444 B2
(45) Date of Patent: Mar. 29, 2022

(54) METHOD OF PREPARING $CO_2$-SELECTIVE MEMBRANES BY CONTROLLING CALCINATION PROCESS INCLUDING RAPID THERMAL PROCESSING AND MEMBRANES PRODUCED THEREBY

(71) Applicant: Korea University Research and Business Foundation, Seoul (KR)

(72) Inventors: Jungkyu Choi, Seoul (KR); Kwan Young Lee, Seoul (KR); Sung-Won Hong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 14 days.

(21) Appl. No.: 16/920,336

(22) Filed: Jul. 2, 2020

(65) Prior Publication Data
US 2021/0001285 A1    Jan. 7, 2021

(30) Foreign Application Priority Data
Jul. 3, 2019    (KR) .................. 10-2019-0079984

(51) Int. Cl.
*B01D 53/22* (2006.01)
*B01D 71/02* (2006.01)
(Continued)

(52) U.S. Cl.
CPC ......... *B01D 71/028* (2013.01); *B01D 53/228* (2013.01); *B01D 67/0051* (2013.01);
(Continued)

(58) Field of Classification Search
CPC ............ B01D 67/0083; B01D 2323/12; B01D 67/0051; B01D 71/028; B01D 53/228; B01D 2323/08; B01D 69/10; C01B 39/48
See application file for complete search history.

(56) References Cited

U.S. PATENT DOCUMENTS 3,783,123 A * 1/1974 Young ................ C10G 49/08
                                                208/111.15
3,842,016 A * 10/1974 Young ................ C10G 49/08
                                                502/74
(Continued)

FOREIGN PATENT DOCUMENTS

| JP | 2008-534272 A | 8/2008 |
|---|---|---|
| JP | 2012-45483 A | 3/2012 |
| KR | 10-2019-0056114 A | 5/2019 |

OTHER PUBLICATIONS

Korean Notice of Allowance dated Feb. 3, 2021 in counterpart Korean Patent Application No. 10-2019-0079984 (2 pages in English and 2 pages in Korean).

(Continued)

*Primary Examiner* — Anthony R Shumate
(74) *Attorney, Agent, or Firm* — NSIP Law

(57) ABSTRACT

Disclosed are a method of preparing carbon-dioxide-selective separation membranes by controlling calcination conditions including rapid thermal processing and separation membranes produced thereby. More particularly, disclosed are a method of preparing carbon-dioxide-selective separation membranes that can improve $CO_2$ permselectivity, particularly, exhibit excellent $CO_2$ permselectivity in the presence of water in the feed gas, by controlling the size of defects in the separation membranes using rapid thermal processing, separation membranes produced thereby, and a method of capturing and removing carbon dioxide using the separation membranes.

15 Claims, 15 Drawing Sheets
(13 of 15 Drawing Sheet(s) Filed in Color)

(51) Int. Cl.
  *B01D 67/00* (2006.01)
  *C01B 39/48* (2006.01)
  *B01D 69/10* (2006.01)
(52) U.S. Cl.
  CPC ......... *B01D 67/0083* (2013.01); *B01D 69/10* (2013.01); *C01B 39/48* (2013.01); *B01D 2323/08* (2013.01); *B01D 2323/12* (2013.01)

(56) References Cited

U.S. PATENT DOCUMENTS

| | | | | |
|---|---|---|---|---|
| 8,668,764 | B2* | 3/2014 | Brown | B01D 71/028 95/51 |
| 8,679,227 | B2* | 3/2014 | Falconer | B01D 53/228 95/51 |
| 8,821,616 | B2* | 9/2014 | Zhou | B01D 69/148 96/4 |
| 9,375,678 | B2* | 6/2016 | Nair | B01D 69/148 |
| 2009/0266237 | A1* | 10/2009 | Serra Alfaro | B01D 67/0083 96/154 |
| 2012/0031833 | A1* | 2/2012 | Ho | B01D 67/0072 210/488 |
| 2012/0148828 | A1 | 6/2012 | Tsapatsis et al. | |
| 2013/0064747 | A1* | 3/2013 | Zhou | B01D 69/10 423/230 |
| 2013/0129611 | A1* | 5/2013 | Maurer | C01B 39/46 423/709 |
| 2016/0194257 | A1* | 7/2016 | Lilga | C10G 69/126 585/255 |
| 2018/0237307 | A1* | 8/2018 | Nakao | B01J 35/023 |
| 2019/0105639 | A1* | 4/2019 | Maehama | C01B 39/46 |

OTHER PUBLICATIONS

Korean Office Action dated Aug. 7, 2020 in counterpart Korean Patent Application No. 10-2019-0079984 (5 pages in English and 6 pages in Korean).
Mason et al., "Evaluating metal-organic frameworks for post-combustion carbon dioxide capture via temperature swing adsorption," Energy & Environmental Science, 2011, vol. 4. pp. 3030-3040.
Figueroa et al., "Advances in $CO^2$ capture technology—The U.S. Department of Energy's Carbon Sequestration Program," International Journal of Greenhous Gas Control, 2008, vol. 2, pp. 9-20.
Bollini et al., "Amine-oxide hybrid materials for acid gas separations," Journal of Materials Chemistry, vol. 21, 2011, pp. 15100-15120.
Zhao et al., "A parametric study of $CO_2/N_2$ gas separation membrane processes for post-combustion capture", Journal of Membrane Science, 2008, vol. 325, pp. 284-294.
Merkel et al., "Power plant post-combustion carbon dioxide capture: An opportunity for Membranes," Journal of Membrane Science, 2010, vol. 359, pp. 126-139.
Zhai et al., "Techno-Economic Assessment of Polymer Membrane Systems for Postcombustion Carbon Capture at Coal-Fired Power Plants," Environmental Science & Technology, 2013, vol. 47, pp. 3006-3014.
Himeno et al., "Synthesis and Permeation Properties of a DDR-Type Zeolite Membrane for Separation of $CO_2/CH_4$ Gaseous Mixtures," Ind. Eng. Chem. Res., 2007, vol. 46, pp. 6989-6997.
Kalipcilar et al., "Synthesis and Separation Performance of SSZ-13 Zeolite Membranes on Tubular Supports," Chem. Mater., 2002, vol. 14, pp. 3458-3464.
Kim et al., "An oriented, siliceous deca-dodecasil 3R (DDR) zeolite film for effective carbon capture: insight into its hydrophobic effect," Journal of Materials Chemistry A, 2017, vol. 5, pp. 11246-11254.
Adil et al., "Valuing Metal-Organic Frameworks for Postcombustion Carbon Capture: A Benchmark Study for Evaluating Physical Adsorbents," Advanced Materials, 2017, 10 pages.
Snider et al., "Gas sorption studies on Zeolite Y membrane materials for post-combustion $CO_2$ capture in coal-fired plants," Microporous and Mesoporous Materials, 2014, vol. 192, pp. 3-7.
Yuan et al., "Adsorption of CO2, CH4, and N2 on Ordered Mesoporous Carbon: Approach for Greenhouse Gases Capture and Biogas Upgrading," Environmental Science & Technology, 2013, 30 pages.
Sun et al., "Selection of appropriate biogas upgrading technology—a review of biogas cleaning, upgrading and utilisation," Renewable and Sustainable Energy Reviews, 2015, vol. 51, pp. 521-532.
Venna et al., "Highly Permeable Zeolite Imidazolate Framework-8 Membranes for $CO_2/CH_4$ Separation," J. Am. Chem. Soc., 2010, vol. 132, pp. 76-78.
Nugent et al., "Porous materials with optimal adsorption thermodynamics and kinetics for $CO_2$ separation," Nature, 2013, 5 pages.
Breck, "Aperture Sizes in Dehydrated zeolites," Zeolite Molecular Sieves: Structure, Chemistry, and Use, John Wiley & Sons, Inc., 1974, p. 65.
Kosinov et al., "Recent developments in zeolite membranes for gas separation," Journal of Membrane Science, 2016, vol. 499, pp. 65-79.
Lin et al., "Microporous Inorganic Membranes," Separation & Purification Reviews, 2002, vol. 31, pp. 229-379.
Snyder et al., "Hierarchical Nanomanufacturing: From Shaped Zeolite Nanoparticles to High-Performance Separation Membranes," Angew. Chem., Int. Ed., 2007, vol. 46, pp. 7560-7573.
Kim et al., "Uniform Si-CHA Zeolite Layers Formed by a Selective Sonication-Assisted Deposition Method," Angew. Chem., Int. Ed., 2013, vol. 52, pp. 5280-5284.
Kosinov et al., High flux high-silica SSZ-13 membrane for $CO_2$ separation, Journal of Materials Chemistry A, 2014, vol. 2, pp. 13083-13092.
Kida et al., "Pure silica CHA-type zeolite membranes for dry and humidified $CO_2/CH_4$ mixtures separation," Separation and Purification Technology, 2018, vol. 197, pp. 116-121.
Yu et al., "Highly permeable CHA membranes prepared by fluoride synthesis for efficient $CO_2/CH_4$ separation," Journal of Materials Chemistry A, 2018, 9 pages.
Bedard et al., "Recent Advances in Zeolitic Membranes," Annual Reviews, 2018, vol. 48, pp. 83-110.
Choi et al., "Grain Boundary Defect Elimination in a Zeolite Membrane by Rapid Thermal Processing," Science, 2009, vol. 325, pp. 590-593.
Lee et al., "On the performance of c-oriented MFI zeolite Membranes treated by rapid thermal processing," Journal of Membrane Science, 2013, vol. 436, pp. 79-89.
Schillo et al., "Rapid thermal processing of inorganic membranes," Journal of Membrane Science, 2010, vol. 362, pp. 127-133.
Wang et al., "Development of rapid thermal processing of tubular cobalt oxide silica membranes for gas separations," Journal of Membrane Science, 2014, vol. 456, pp. 192-201.
Yoo et al., "High-Performance Randomly Oriented Zeolite Membranes Using Brittle Seeds and Rapid Thermal Processing," Angew. Chem., Int. Ed., 2010, vol. 49, pp. 8699-8703.
Hong et al., "Healing of Microdefects in SSZ-13 Membranes via Filling with Dye Molecules and Its Effect on Dry and Wet CO2 Separations," Chemistry of Materials, 2018, vol. 30, pp. 3346-3358.
Korelskiy et al., "Selective blocking of grain boundary defects in high-flux zeolite membranes by coking," Journal of Materials Chemistry A, 2017, vol. 5, pp. 7295-7299.
Karimi et al., "A simple method for blocking defects in zeolite membranes," Journal of Membrane Science, 2015, vol. 489, pp. 270-274.
Lee et al., "Chabazite-Type Zeolite Membranes for Effective $CO_2$ Separation: The Role of Hydrophobicity and Defect Structure," ACS Applied Material & Interfaces, 2019, vol. 11, pp. 3946-3960.
Gu et al., "Synthesis of Defect-Free FAU-Type Zeolite Membranes and Separation for Dry and Moist $CO_2/N_2$ Mixtures," Ind. Eng. Chem. Res., 2005, vol. 44, pp. 937-944.
Kim et al., "Chemical Vapor Deposition on Chabazite (CHA) Zeolite Membranes for Effective Post-Combustion $CO_2$ Capture," Environmental Science & Technology, 2014, vol. 48, pp. 14828-14836.

(56) References Cited

OTHER PUBLICATIONS

Zhu et al., "Desalination of seawater ion complexes by MFI-type zeolite membranes: Temperature and long term stability," Journal of Membrane Science, 2014, vol. 453, pp. 126-135.
Wang et al., "Highly stable bilayer MFI zeolite membranes for high temperature hydrogen separation," Journal of Membrane Science, 2014, vol. 450, pp. 425-432.
Baker et al., "$CO_2$ capture from natural gas power plants using selective exhaust gas recycle membrane designs," International Journal of Greenhouse Gas Control, 2017, vol. 66, pp. 35-47.
Siegelman et al., "Challenges and opportunities for adsorption-based $CO_2$ capture from natural gas combined cycle Emissions," Energy & Environmental Science, 2019, vol. 12, pp. 2161-2173.
Baker et al., "CO2 Capture from Cement Plants and Steel Mills using Membranes," Industrial & Engineering Chemistry Research, 2018, vol. 57, (2018), 30 pages.
He, "A review of material development in the field of carbon capture and the application of membrane-based processes in power plants and energy-intensive industries," Energy, Sustainability and Society, 2018, vol. 8, 14 pages.
Korelskiy et al., "Efficient ceramic zeolite membranes for $CO_2/H_2$ Separation," Journal of Materials Chemistry A, 2015, 7 pages.
Diaz-Cabanas et al., "Synthesis and structure of pure $SiO_2$ chabazite: the $SiO_2$ polymorph with the lowest framework density," Chem. Commun., 1998, pp. 1881-1882.

\* cited by examiner

METHOD OF PREPARING $CO_2$-SELECTIVE MEMBRANES BY CONTROLLING CALCINATION PROCESS INCLUDING RAPID THERMAL PROCESSING AND MEMBRANES PRODUCED THEREBY

CROSS-REFERENCE TO RELATED APPLICATIONS

This application claims the benefit under 35 USC § 119(a) of Korean Patent Application No. 10-2019-0079984 filed on Jul. 3, 2019 in the Korean Intellectual Property Office, the entire disclosure of which is incorporated herein by reference for all purposes.

TECHNICAL FIELD

The present invention relates to a method of preparing carbon-dioxide-selective separation membranes by controlling calcination conditions including rapid thermal processing and separation membranes produced thereby. More particularly, the present invention relates to a method of preparing carbon-dioxide-selective separation membranes that improve $CO_2$ permselectivity and separation performance by controlling the size of defects in the separation membranes using rapid thermal processing and membranes produced thereby.

BACKGROUND ART

Post-combustion carbon capture from the flue gas stream of fossil-fuel-fired power plants requires the effective separation of $CO_2$ from the main flue gas component, $N_2$ (J. A. Mason et al., Energy Environ. Sci. 4 (2011) 3030-3040; J. D. Figueroa et al., J. Greenh. Gas Control 2 (2008) 9-20; P. Bollini et al., J. Mater. Chem. 21 (2011) 15100-15120). Thus, membrane-based $CO_2$ separation has been considered as an alternative to conventional energy-intensive amine-based $CO_2$ capture (L. Zhao et al., J. Membr. Sci. 325 (2008) 284-294; T. C. Merkel et al., J. Membr. Sci. 359 (2010) 126-139; H. B. Zhai et al., Environ. Sci. Technol. 47 (2013) 3006-3014). In particular, zeolites, if appropriately chosen, show excellent molecular sieving effects for $CO_2/N_2$ separation performance (S. Himeno et al., Ind. Eng. Chem. Res. 46 (2007) 6989-6997; H. Kalipcilar et al., Chem. Mater. 14 (2002) 3458-3464; E. Kim et al., Journal of Materials Chemistry A: Materials for Energy and Sustainability 5 (2017) 11246-11254). Furthermore, the preservation of high separation performance in water-containing feeds is highly desirable (K. Adil et al., A Benchmark Study for Evaluating Physical Adsorbents, Adv. Mater. 29 (2017) 10) because an additional dehumidification process inevitably increases the amount of energy that is required (M. T. Snider et al., Micropor. Mesopor. Mater. 192 (2014) 3-7). Suitable zeolites can be directly applied to $CO_2$ separation from $CH_4$ (a larger molecule than $N_2$), which is closely associated with biogas and natural gas upgrading (B. Yuan et al., Environ. Sci. Technol. 47 (2013) 5474-5480; Q. Sun et al., Renew. Sust. Energ. Rev. 51 (2015) 521-532; S. R. Venna et al., J. Am. Chem. Soc. 132 (2010) 76; P. Nugent et al., Nature 495 (2013) 80-84).

Among the zeolites, eight-membered-ring (8 MR) zeolites (maximum pore size of 0.43 nm) (D. W. Breck, Zeolite Molecular Sieves: Structure, Chemistry, and Use, John Wiley & Sons, Inc., 1974), including chabazite (CHA) and deca-dodecasil 3R (DDR)-type zeolites, are highly desirable for distinguishing the slight size difference between $CO_2$ (0.33 nm) and $N_2$ (0.364 nm) (N. Kosinov et al., J. Membr. Sci. 499 (2016) 65-79). Despite the high potential, the synthesis of zeolite membranes essentially inevitably depends on a trial-and-error approach that requires considerable effort of many researchers. In general, zeolite separation membranes are synthesized through seed growth and hydrothermal synthesis. After depositing zeolite particles, acting as seeds, on a porous support, a continuous separation membrane is obtained through a hydrothermal reaction in a zeolite synthetic sol. Although the secondary growth method is a reliable synthetic method that is widely used (Y. S. Lin et al., Purif. Methods 31 (2002) 229-379; M. A. Snyder et al., Angew. Chem., Int. Ed. 46 (2007) 7560-7573), the resulting zeolite separation membranes are consistently defective even in consideration of the appearance based on SEM resolution, and often exhibit poor separation performance due to the non-selective and weak pathway caused by these defects (E. Kim et al., Angew. Chem., Int. Ed. 52 (2013) 5280-5284).

In fact, SSZ-13 (CHA-type zeolite; 0.37×0.42 $nm^2$) membranes show high $CO_2/N_2$ separation performances. Initially, Kalipcilar et al. reported the feasibility of SSZ-13 membranes for effective $CO_2/N_2$ separation, obtaining a maximum $CO_2/N_2$ separation factor (SF) of 10 at ~30° C. (H. Kalipcilar et al., Chem. Mater. 14 (2002) 3458-3464). However, multiple in-situ synthesis steps are necessary in order to achieve high $CO_2/N_2$ separation performance. In a previous study (N. Kosinov et al., Journal of Materials Chemistry A: Materials for Energy and Sustainability 2 (2014) 13083-13092), SSZ-13 membranes fabricated on $\alpha$-$Al_2O_3$ capillary tubes showed remarkable $CO_2/N_2$ separation performance Preferably, the presence of $H_2O$ resulted in an increase in the $CO_2/N_2$ SF at the expense of reduced $CO_2$ permeance. CHA zeolite can be applied to $CO_2/N_2$ discharged from flue gas and biogas upgrading ($CO_2/CH_4$), and flue gas or biogas always contains 10 vol % of water, thereby requiring additional moisture removal during the separation process. Since the separation process requires additional energy and expenses for moisture removal, it is necessary to develop a separation membrane that maintains the separation performance of the separator without removing moisture from the feed. Recently, secondary growth in a fluoride medium has been shown to be effective for obtaining high-performance CHA type zeolite membranes, apparently by reducing the intrinsic defects in the zeolite structure (K. Kida et al., Purif. Technol. 197 (2018) 116-121; L. Yu et. al., Journal of Materials Chemistry A: Materials for Energy and Sustainability 6 (2018) 6847-6853). In particular, TMAdaF, synthesized using a combination of the conventional structure-directing agent (SDA) N,N,N-trimethyl-1-adamantan-ammonium hydroxide (TMAdaOH) and hydrofluoric acid (HF), is key to synthesizing CHA separation membranes with excellent $CO_2$ permselectivity and a high $CO_2$ molar flux (~1×$10^{-6}$ mol·$s^{-1}$·$m^2$·$Pa^{-1}$) under dry conditions. Compared to the dry feed gas, the CHA separation membranes, albeit supposedly hydrophobic, showed modest $CO_2/CH_4$ SFs (~10-20) with respect to $H_2O$-vapor-containing feed gas (L. Yu et al., Journal of Materials Chemistry A: Materials for Energy and Sustainability 6 (2018) 6847-6853). Siliceous SSZ-13 separation membranes are still desirable for maintaining a high $CO_2/N_2$ separation performance compared to the wet feed gas because the adsorption of $H_2O$ vapor on the membrane outer/inner surface is not pronounced.

Although more reliable than simultaneous growth, secondary growth requires optimization, particularly with regard to high hydrothermal growth for high coverage of the seed layer or sufficient internal growth of the seed particles.

Significantly, the as-synthesized membranes, although seemingly well intergrown, often fail to preserve the original membrane continuity, primarily because of the need for thermal activation, i.e., calcination (R. Bedard et al., Annual Reviews: Palo Alto, 2018; Vol. 48, pp 83-110). Accordingly, this reduces the success rate of the secondary-growth-based membrane formation process. The separation performance of zeolite membranes is strongly dependent on the defect structure, and accordingly is affected by the calcination of the as-synthesized zeolite membranes. As a method of optimizing the defect structure, rapid thermal processing (RTP), in contrast to conventional slow calcination, has been proven to be effective for reducing the defects in MFI-type zeolite membranes (J. Choi et al., Science 325 (2009) 590-593; T. Lee et al., J. Membr. Sci. 436 (2013) 79-89). In addition, the short processing time with RTP is another advantage (M. C. Schillo et al., J. Membr. Sci. 362 (2010) 127-133; D. K. Wang et al., J. Membr. Sci. 456 (2014) 192-201). The use of RTP before slow calcination (J. Choi et al., Science 325 (2009) 590-593) or in place of slow calcination (W. C. Yoo et al., Angew. Chem., Int. Ed. 49 (2010) 8699-8703) allows the production of different microdefect structures in MFI-type zeolite membranes in a reproducible way. Indeed, the low proportion of defects (on the order of ~0.1-1%) in zeolite membranes contributes significantly to the final molar flux of a desired molecule (S. Hong et al., Chem. Mater. 30 (2018) 3346-3358; D. Korelskiy et al., Materials for Energy and Sustainability 5 (2017) 7295-7299; S. Karimi et al., J. Membr. Sci. 489 (2015) 270-274). This demonstrates the importance of understanding the quantitative effect of defects on final membrane performance and, at the same time, secures a reliable method for reducing and controlling the degree of defects (M. Lee et al., ACS Appl. Mater. Interfaces 11 (2019) 3946-3960). Although an RTP-treated SAPO-34 separation membrane has been shown to exhibit improved $CO_2$ permselectivity in a recent study (M. Lee et al., ACS Appl. Mater. Interfaces 11 (2019) 3946-3960), its ability to preserve the high performance of $H_2O$-vapor-containing feed gas requires further investigation.

Therefore, as a result of extensive efforts to solve these problems, the present inventors found that the size of defects can be reduced and thus $CO_2$ permselectivity can be improved using rapid thermal processing (RTP) for the process of preparing a zeolite separation membrane, in particular, high $CO_2$ permselectivity can be obtained in the presence of moisture in the feed gas. The present invention has been completed based on this finding.

SUMMARY OF THE INVENTION

Therefore, the present invention has been made in view of the above problems, and it is one object of the present invention to provide a separation membrane having higher $CO_2$ permselectivity under both dry and wet conditions than conventional zeolite separation membranes and a method of preparing the same.

It is another object of the present invention to provide a method of separating $CO_2$ using the separation membrane.

In accordance with an aspect of the present invention, the above and other objects can be accomplished by the provision of a method of preparing a CHA zeolite separation membrane having a controlled size of defects, including (a) adding a support having a CHA particle seed layer deposited thereon to a synthetic solution for zeolite growth containing an organic-structure-inducing agent and Si and Al as raw materials and, then conducting hydrothermal synthesis, (b) conducting rapid calcination at a temperature of 700 to 1,200° C. for 10 seconds to 5 minutes after hydrothermal synthesis, and (c) conducting low-temperature calcination by heating at a low temperature of 450 to 550° C.

In accordance with another aspect of the present invention, there is provided a CHA zeolite separation membrane produced by the method.

In accordance with yet another aspect of the present invention, there is provided a method for separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the CHA zeolite separation membrane.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

Figure 10:
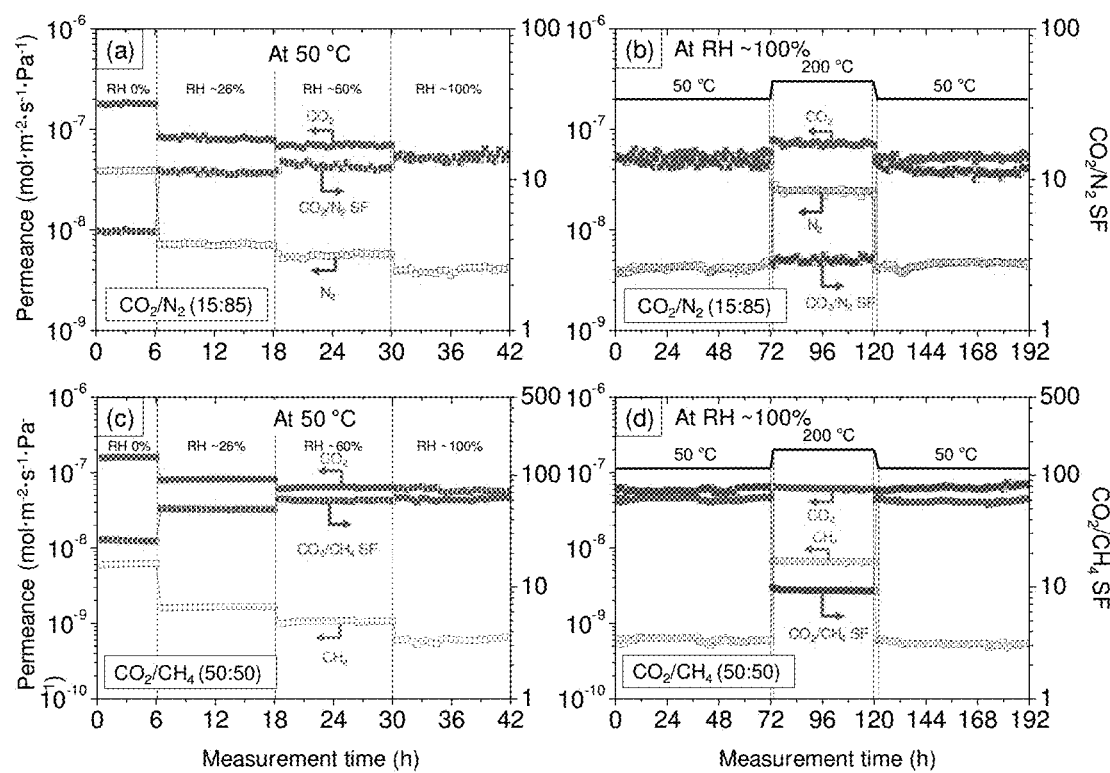
Figure 11:
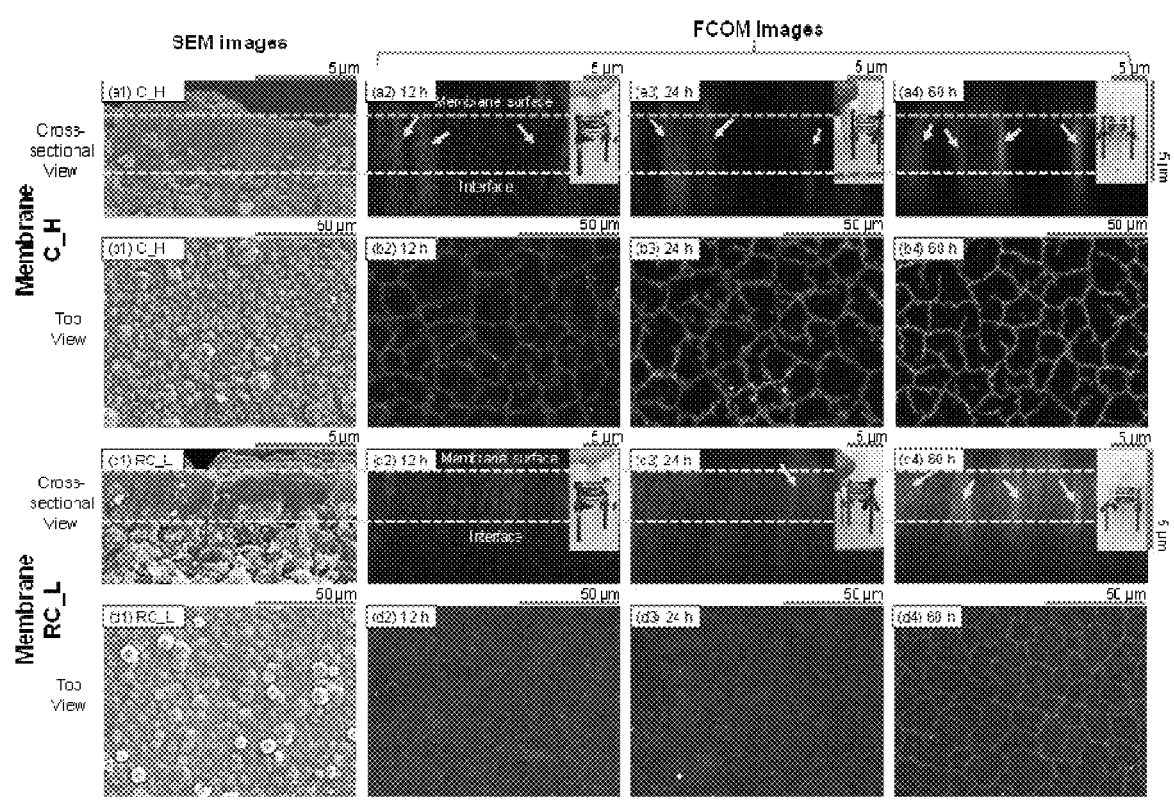
Figure 12:
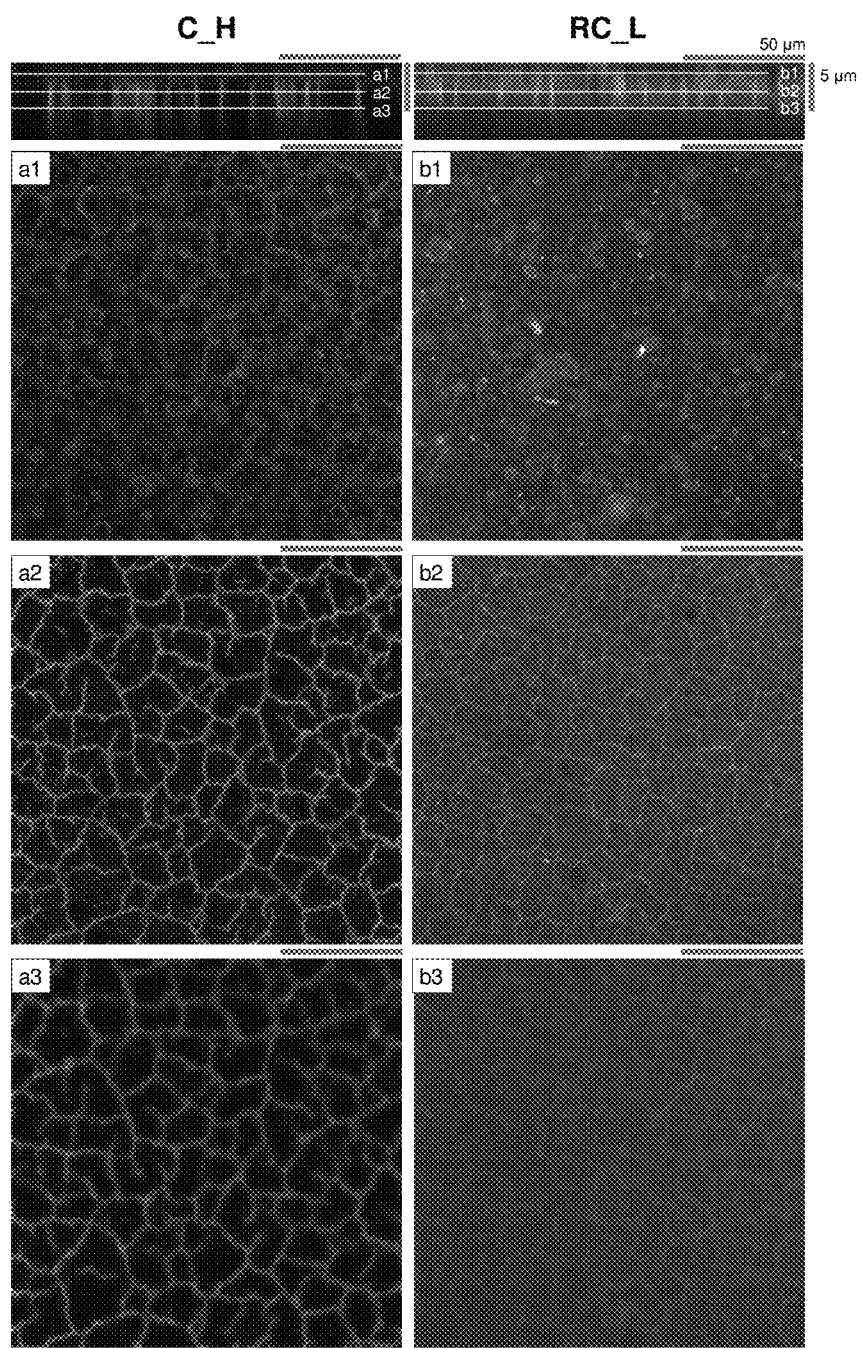
Figure 13:
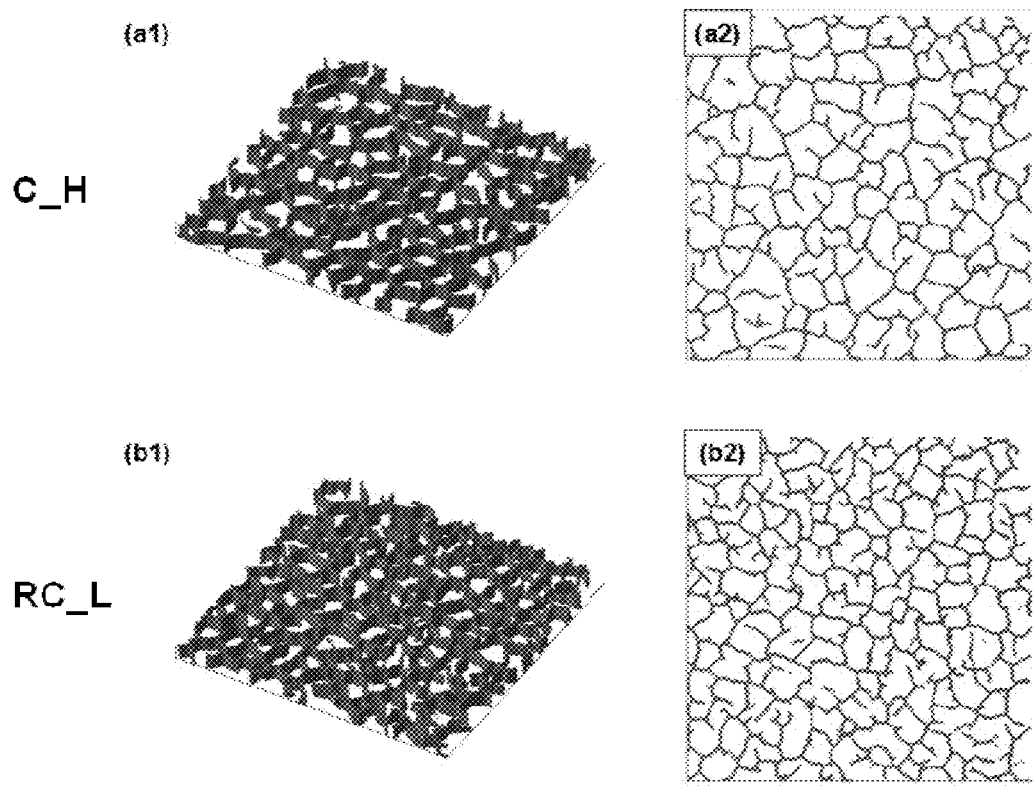
Figure 14:
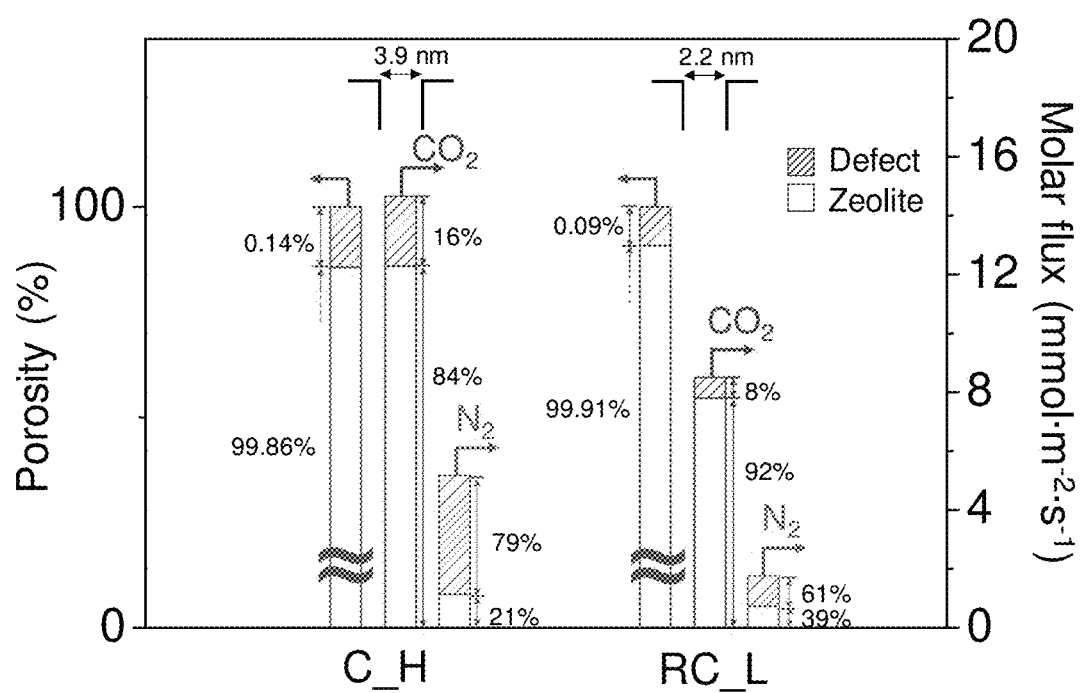
Figure 15:
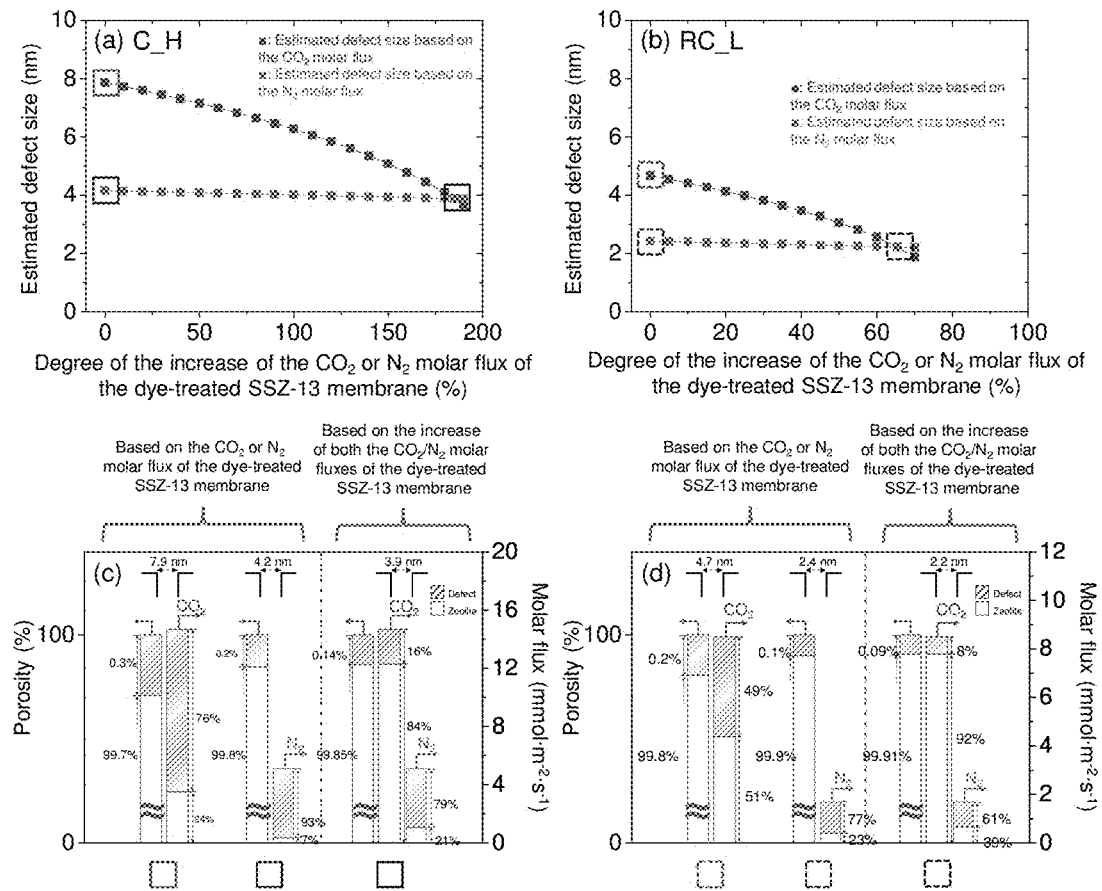
Figure 16:
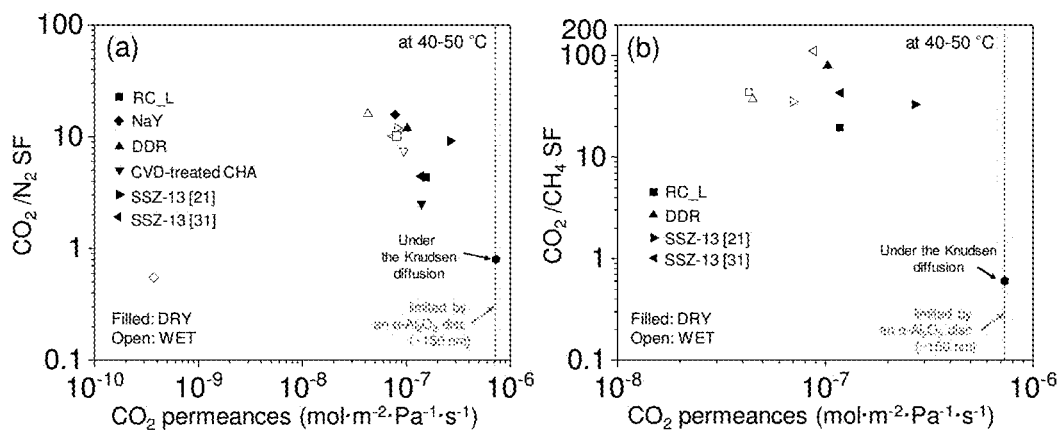

and (b) wet (50:50 WET) conditions, respectively, according to an embodiment of the present invention;

FIG. 10 shows the long-term stability and permeability of (a)-(b) $CO_2/N_2$ and (c)-(d) $CO_2/CH_4$ binary mixtures with respect to RC_L under wet conditions according to an embodiment of the present invention;

FIG. 11 shows cross-sectional view and top view SEM images ($1^{st}$ row) and FCOM images ($2^{nd}$-$4^{th}$ rows) of C_H (upper two columns) and RC_L (lower two columns) according to an embodiment of the present invention;

FIG. 12 shows cross-sectional view ($1^{st}$ row) and top view ($2^{nd}$-$4^{th}$ row) FCOM images of C_H (left) and RC_L (right) according to an embodiment of the present invention;

FIG. 13 shows images obtained by performing image processing on the FCOM images of (a1)-(a2) C_H and (b1)-(b2) RC_L shown in FIGS. 11 and 12 according to an embodiment of the present invention;

FIG. 14 shows the porosity of non-zeolite parts and zeolite parts, and the total amount of $CO_2$ and $N_2$ permeation thereof with reference to the SSZ-13 separation membrane with fewer defects obtained through post-treatment of C_H and RC_L (S. Hong et al., Chem. Mater. 30 (2018) 3346-3358);

FIG. 15 shows quantitative values obtained through FCOM and the size of defects of (a) C_H and (b) RC_L estimated using one-dimensional transmission modeling according to an embodiment of the present invention, and (c) and (d) the porosity of defects of C_H and RC_L and the proportion of the permeability of defects to the total $CO_2$ and $N_2$ permeability, respectively, depending on the estimated size of the defect according to an embodiment of the present invention; and FIG. 16 shows (a) a $CO_2/N_2$ separation factor vs. $CO_2$ permeability and (b) a $CO_2/CH_4$ separation factor vs. $CO_2$ permeability under different dry and wet conditions with regard to RC_L along with other zeolite membranes in the literature (NaY [X. H. Gu et al., Ind. Eng. Chem. Res. 44 (2005) 937-944], DDR [E. Kim et al., Materials for Energy and Sustainability 5 (2017) 11246-11254], chemical vapor deposition (CVD)-treated CHA [E. Kim et al., Environ. Sci. Technol. 48 (2014) 14828-14836], and SSZ-13 [N. Kosinov et al., Journal of Materials Chemistry A: Materials for Energy and Sustainability 2 (2014) 13083-13092; S. Hong et al., Chem. Mater. 30 (2018) 3346-3358]).

BEST MODE FOR CARRYING OUT THE INVENTION

Unless defined otherwise, all technical and scientific terms used herein have the same meanings as appreciated by those skilled in the field to which the present invention pertains. In general, the nomenclature used herein is well-known in the art and is ordinarily used.

Unless defined otherwise, all technical and scientific terms used herein have the same meanings as appreciated by those skilled in the field to which the present invention pertains. In general, the nomenclature used herein is well-known in the art and is ordinarily used.

It was found that, when the size of defects is reduced using rapid thermal processing (RTP) during the process of preparing a zeolite separation membrane, $CO_2$ permselectivity can be improved compared to a conventional zeolite separation membrane; in particular, high $CO_2$ permselectivity can be obtained in the presence of moisture in the feed gas.

Thus, in one aspect, the present invention is directed to A method of preparing a CHA zeolite separation membrane in which a size of defects is controlled, including (a) adding a support having a CHA particle seed layer deposited thereon to a synthetic solution for zeolite growth containing an organic-structure-inducing agent and Si and Al as raw materials and, then conducting hydrothermal synthesis, (b) conducting rapid calcination at a temperature of 700 to 1,200° C. for 10 seconds to 5 minutes after hydrothermal synthesis, and (c) conducting low-temperature calcination by heating at a low temperature of 450 to 550° C.

In the present invention, the microstructure of a defective hydrophobic SSZ-13 membrane can be applied as a coordinator for effective gas separation for $CO_2$ separation through a calcination process based on RTP.

In fact, RTP is effective in reducing the incidence of defects in SSZ-13 separation membranes, unlike conventional slow calcination. Therefore, the $CO_2$ permselectivity of the SSZ-13 separation membrane treated with RTP can be improved compared to the slowly calcined SSZ-13 membrane. This improvement is even more pronounced when water vapor is present in the feed gas. Furthermore, image analysis through fluorescence confocal optical microscopy imaging was supplemented as a permeation model to perform quantitative understanding of the experimentally permeating amount of $CO_2$ molecules. Obviously, it was found that reduction of the size of the defect through a combination of the RTP-treated SSZ-13 membrane, though the slow-calcined SSZ-13 membrane having similar numbers of defects therein, is key to achieving high performance.

Figure 1A:
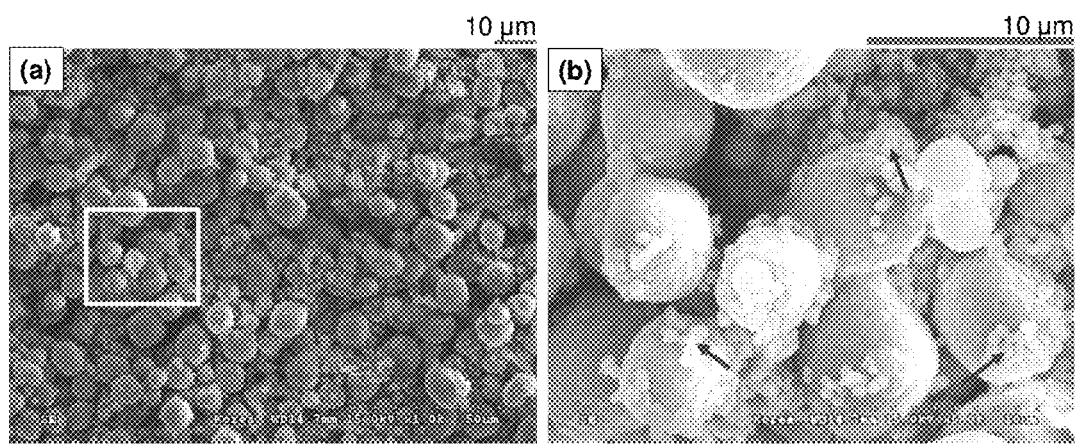
FIG. 1A shows (a) low- and (b) high-magnification SEM images showing SSZ-13 particles of a separation membrane according to an embodiment of the present invention.
Figure 1B:
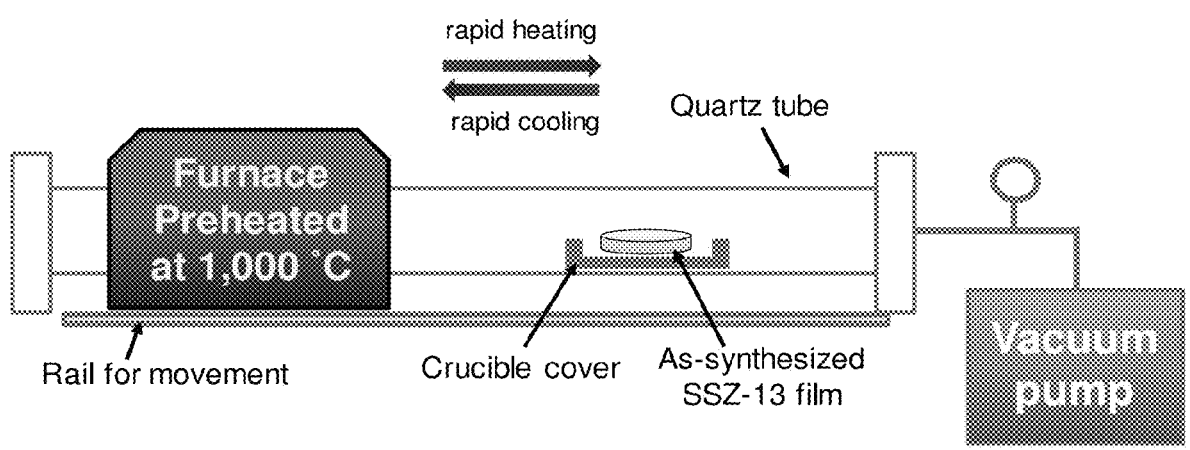
FIG. 1B is a schematic diagram illustrating an RTP apparatus according to an embodiment of the present invention.

The method of manufacturing a CHA zeolite separation membrane having a controlled size of defects according to the present invention includes the following steps, and may be performed using the RTP equipment according to the present invention shown in FIG. 1B:

(a) adding a support having a CHA particle seed layer deposited thereon to a synthetic solution for zeolite growth containing an organic structure-inducing agent and a Si and Al raw material and conducting hydrothermal synthesis;

(b) conducting rapid calcination at a temperature of 700 to 1200° C. for 10 seconds to 5 minutes after hydrothermal synthesis; and (c) conducting low-temperature calcination by heating at a temperature of 450 to 550° C.

That is, the method includes hydrothermal synthesis, rapid calcination, and slow calcination. In the present invention, after the hydrothermal synthesis, rapid calcination is conducted at a temperature of 700 to 1,200° C., preferably 1,000 to 1,200° C., for 10 seconds to 5 minutes, preferably 30 seconds to 5 minutes, and more preferably 1 minute to 1 minute 30 seconds. When rapid calcination is conducted within the temperature and time ranges defined above, there is an effect of reducing the incidence and size of defects.

In the present invention, the low-temperature calcination of step (c) may be slow calcination of heating at a ramp rate of 0.1 to 5° C./min for 12 to 100 hours.

In the present invention, the molar ratio of Si/Al may be 5 to 1,000, preferably 10 to 500, and most preferably 20 to 200.

In the present invention, the support may include at least one selected from the group consisting of alumina such as α-alumina or γ-alumina, polypropylene, polyethylene, polytetrafluoroethylene, polysulfone, polyimide, silica, glass, mullite, zirconia, titania, yttria, ceria, vanadia, silicon, stainless steel and carbon.

In the present invention, the organic-structure-directing agent may include one or more selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), TMAdaI (N,N,N-trimethyl adamantylammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide) and cyclohexylamine.

In the present invention, the synthetic solution for zeolite growth may be composed of a molar ratio of TMAdaOH:$SiO_2$:$H_2O$:$Na_2O$:$Al_2O_3$ of 1 to 100:100:1000 to 20000:0.5 to 50:0 to 10.

In the present invention, the defect structure of the hydrophobic SSZ-13 separation membrane is found to be controlled using RTP. In particular, the defect size was effectively reduced. Compared to the conventionally calcinated SSZ-13 separation membrane, the RTP-treated SSZ-13 separation membrane had distinct $CO_2$ permselectivity for $CO_2/N_2$ and $CO_2/CH_4$ mixtures. The maximum SFs of $CO_2/N_2$ and $CO_2/CH_4$ at 30° C. were 4.8 and 22.2, respectively. More preferably, the RTP-treated SSZ-13 separation membrane had a maximum enhanced $CO_2/N_2$ (10.1) or $CO_2/CH_4$ (43.7) SF at 50° C. (typical temperature of flue gas and biogas exhaust gas) under wet conditions. It can be seen that the SSZ-13 separation membrane is suitable for obtaining high $CO_2$ permselectivity, despite the presence of water in the feed gas, when the defect structure is appropriately adjusted to decrease the deterioration of the separation performance because of the defect.

In the present invention, it was confirmed that the CHA zeolite separation membrane prepared by the method was not affected by the temperature or pressure of the exhaust gas, but was able to provide and maintain higher $CO_2$ separation performance under feed conditions containing water.

In another aspect, the present invention provides a CHA zeolite separation membrane having a controlled defect produced by the method.

The CHA zeolite separation membrane produced by the method according to the present invention is capable of reducing the size of defects from 4 nm to 2 nm.

In another aspect, the present invention provides a method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the CHA zeolite separation membrane.

In the present invention, the separation may be performed at a temperature of 30 to 200° C. under dry conditions and 30 to 200° C. under wet conditions.

In the present invention, the separation factor of $CO_2/N_2$ of the exhaust gas containing water may be 10 to 30, and the separation factor of $CO_2/CH_4$ for upgrading biogas containing water may be 10 to 80.

In the use of the CHA zeolite separation membrane according to the present invention, the separation of carbon dioxide includes all of separation, capture and removal of carbon dioxide.

Hereinafter, the present invention will be described in more detail with reference to examples. However, it will be obvious to those skilled in the art that these examples are provided only for illustration of the present invention and should not be construed as limiting the scope of the present invention.

EXAMPLE

Production Example 1: Production of CHA Separation Membrane

Seed Crystal Synthesis

SSZ-13 zeolite particles were synthesized in accordance with a reported procedure (H. Kalipcilar et al., Chem. Mater. 14 (2002) 3458-3464). Specifically, N,N,N-trimethyl-1-adamantanammonium hydroxide (25 wt % in water, TMAdaOH, SACHEM, Inc.) was added to deionized (DI) water. Then, given amounts of sodium hydroxide, aluminum hydroxide and fumed silica (CAB—O-Sil® M-5, Cabot Corporation) were added to the solvent. The final $SiO_2$:TMAdaOH:$Al(OH)_3$:NaOH:$H_2O$ molecular composition of the synthetic sol was 100:20:5:20:4,400. The synthetic sol was mixed overnight at room temperature in a shaking machine (Lab Companion, SI-300R). Subsequently, the synthetic sol was moved to a Teflon liner in an autoclave. The hydrothermal reaction was conducted at 160° C. for 3 days, and the result was immersed in tap water. SSZ-13 particles were collected by repeating centrifugation and washing with DI water five times. The obtained SSZ-13 particles were calcined at ~500° C. for 12 hours at a ramp rate of 1° C.·$min^{-1}$ under an air flow of 200 mL·$min^{-1}$. The inductively coupled plasma (ICP) analysis indicates a Si/Al ratio of ~17.5 in the SSZ-13 particles.

Seed Layer Formation

SSZ-13 particles were deposited on α-$Al_2O_3$ porous discs using a dip-coating method. The suspension was prepared by adding the SSZ-13 particles (~0.05 g) to ethanol (40 mL), followed by sonication for 20 minutes. Because of the pronounced bimodal size distribution (about, smaller than 1 μm or larger than 1 μm) of the SSZ-13 particles (FIG. 1A), the suspension was allowed to stand for 5 minutes to allow the larger particles to precipitate to the bottom of the container. For seed particle deposition, the polished surface of an α-$Al_2O_3$ disc was placed in contact with the suspension for 30 seconds, horizontally slid away from the solution into a vertical position, and further dried vertically for 30 seconds. This process was repeated four times. The seeded α-$Al_2O_3$ disc was calcined at 450° C. for 4 hours at a ramp rate of 1° C.·$min^{-1}$ under an air flow of 200 mL·$min^1$.

SSZ-13 Film Growth

The calcined seed layer was further intergrown using the secondary growth method, yielding a final $SiO_2$:$Al(OH)_3$:NaOH:TMAdaOH:$H_2O$ molar composition of 100:5:20:20:8,800. The preparation of the synthetic sol for secondary growth was carried out in accordance with the procedure described above. The prepared sol was first poured into a Teflon liner, in which the calcined SSZ-13 seeded α-$Al_2O_3$ disc was placed at an angle, with the seed side facing downward. Then, hydrothermal growth was carried out at 160° C. for 3 days. Finally, the autoclave was removed from the oven and quenched with tap water.

Rapid Thermal Processing of the as-Synthesized SSZ-13 Films

The as-synthesized films were further thermally treated to open the pores inside the SSZ-13 particles. In an effort to tune the microstructure of the SSZ-13 separation membranes, the as-synthesized film samples were exposed to RTP, followed by conventional slow calcination. For RTP, an as-synthesized film was placed in a quartz tube in a vacuum, and the pre-heated furnace (generally, at 1,000° C. or less) was quickly moved to the film in order to simulate RTP. The RTP-treated film was allowed to cool. A schematic diagram of the RTP process is shown in FIG. 1B. The RTP-treated SSZ-13 separation membranes were further slowly calcined by (1) heating from room temperature to 550° C. at a ramp rate of 0.5° C.·min$^{-1}$ under an air flow of 200 mL·min$^{-1}$ and then allowing the result to stand at the corresponding temperature for 12 hours, or (2) heating from room temperature to 450° C. at a ramp rate of 0.2° C. min$^{-1}$ and then allowing the result to stand at the corresponding temperature for 40 hours. The resulting membranes are designated as RC_H or RC_L, where R and C indicate RTP and conventional slow calcination, respectively, and H and L indicate temperatures of 550° C. and 450° C. used for conventional slow calcination, respectively. In analysis, C in C_H or C_L indicates conventional slow calcination.

Example 1: Characterization of SSZ-13 Separation Membrane

X-ray diffraction (XRD) patterns were obtained using an XRD 3003 (SEIFERT) in a theta/2-theta configuration. Scanning electron microscopy (SEM) images were acquired using a field-emission scanning electron microscope (FE-SEM, Hitachi S-4300/S-4800). A Pt coating was applied using an ion sputterer (Hitachi E-1030). Energy dispersive X-ray (EDX, Hitachi S-4800) analysis was conducted to obtain information about the chemical contents along thickness of the SSZ-13 membrane, i.e., from the membrane surface to the interface of the membrane and the $\alpha$-$Al_2O_3$ support. To visualize the defect structure in the SSZ-13 membranes, fluorescence confocal optical microscopy (FCOM, Zeiss LSM-700) analysis with a solid-state laser (555 nm wavelength) was used. For this purpose, a membrane sample was dyed with the fluorescein sodium salt ($C_{20}H_{10}Na_2O_5$, Sigma-Aldrich (Product No.: F6377)) using an osmosis-type dye contactor. Detailed information concerning the osmosis-type module can be found in T. Lee et al., J. Membr. Sci. 436 (2013) 79-89. Conceptually, the dye molecules have a diameter of 1 nm or more (J. Choi et al., Science 325 (2009) 590-593), which is smaller than the defect size (≥1 nm) but larger than the zeolite pore (≤1 nm), and can selectively penetrate the defects in the zeolite membrane. In the present invention, the membranes were dyed for different durations of 12, 24 and 60 hours for intensive investigation of the defect structure. The resulting FCOM images were further used to obtain the quantitative properties of the defect structure in the SSZ-13 membranes via image processing and 1-D permeation modeling analysis.

The Wicke-Kallenbach mode was adopted for measuring the permeation rates of $CO_2$ and $N_2$ (or $CH_4$). The total pressures on both feed gas and permeation sides were maintained at 1 atm. To examine the effect of water vapor on the membrane, the feed gas was humidified. Specifically, the partial pressures of $CO_2/N_2/H_2O$ (or $CO_2/CH_4/H_2O$) were 48.5 kPa/48.5 kPa/3 kPa, respectively. $CO_2/N_2$ or $CO_2/CH_4$ was fed to the membrane at a total flow rate of 100 mL·min$^{-1}$ on a dry basis, and these mixtures were allowed to permeate through the membrane sample. The resulting permeate was carried by He sweep gas (100 mL·min$^{-1}$) and was analyzed online using a gas chromatograph (GC) system (YL 6100 for $CO_2/N_2$ and YL 6500 for $CO_2/CH_4$, Young Lin Instruments, South Korea), equipped with a packed column (6 ft×⅛" Porapak T for $CO_2/N_2$ and 30 m×0.320 mm GS-GasPro for $CO_2/CH_4$) and a thermal conductivity detector (TCD) for $CO_2/N_2$ and a pulsed discharge ionization detector (PDD) for $CO_2/CH_4$. For reliable analysis, ~5 mL·min$^{-1}$ of $CH_4$ for $CO_2/N_2$ and $H_2$ for $CO_2/CH_4$ measurements were added to the swept permeate gas stream before reaching the GC system. For convenience, the molar composition values for both separations under dry and wet (3 kPa water vapor) conditions is denoted as (x:y DRY) and (x:y WET), respectively, where x and y indicate the dry-basis molar compositions of $CO_2$ and $N_2$ (or $CH_4$), respectively. In addition, for convenience, the permeances of $CO_2$ molecules measured at 30° C. and the corresponding $CO_2/N_2$ SFs under dry and wet conditions are referred to as DRY or WET $CO_2$ permeances and DRY or WET $CO_2/N_2$ SFs, respectively. Furthermore, permeation measurements were carried out at 50° C. while the relative humidity was varied (0%, ~26%, ~60%, and ~100%, corresponding to 0, 3, 7, and 12 kPa, respectively) to observe the effect of the water vapor content on the separation performance of RC_L. Furthermore, permeation tests were conducted at the water vapor pressure of 12 kPa at different temperatures ((1) 50° C. for 3 days, (2) 200° C. for 2 days, (3) 50° C. for 3 days) for determination of the long-term stability of RC_L.

Figure 2:
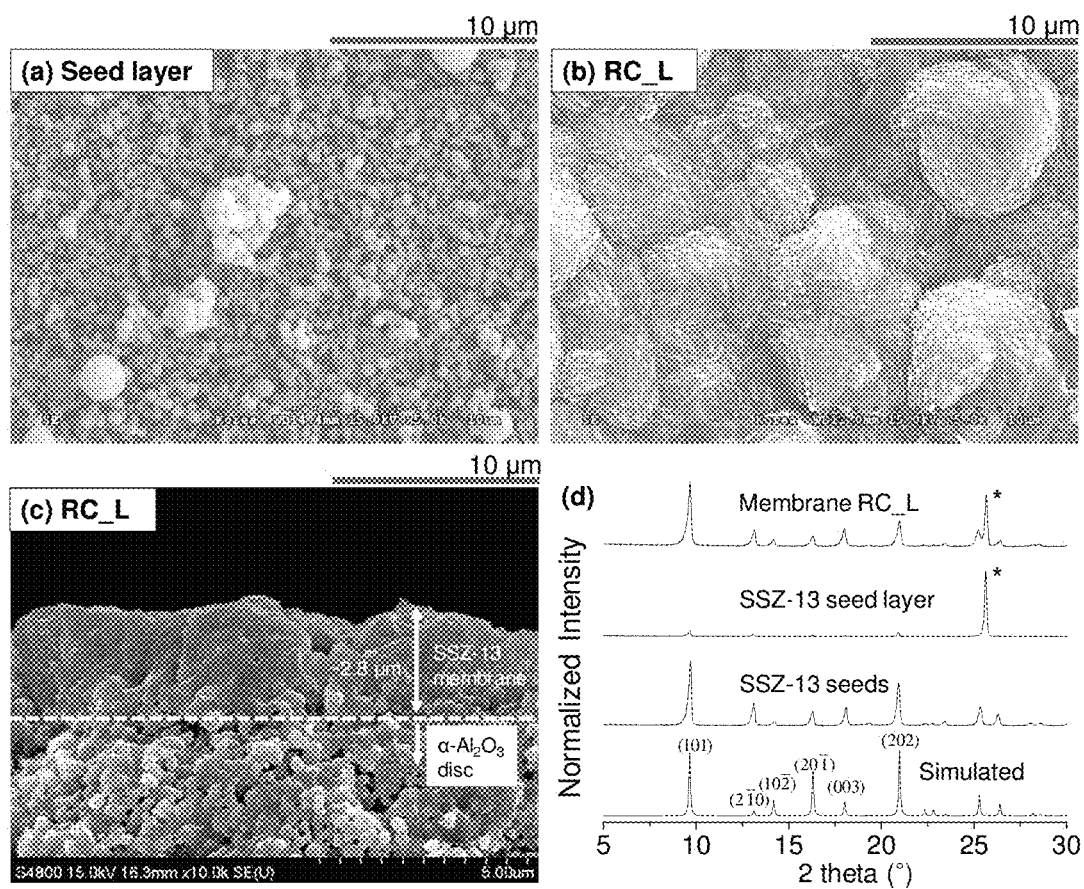
FIG. 2 shows (a) a top-view SEM image of an SSZ-13 seed layer, (b) a top-view SEM image of RC_L, (c) a cross-sectional SEM image of RC_L, and (d) the XRD patterns of SSZ-13 seed particles, SSZ-13 seed layer, and RC_L, along with XRD patterns of silica CHA zeolite, according to an embodiment of the present invention.

FIG. 2a shows that a continuous seed layer was well-formed. FIG. 2d clearly shows that the seed layer was composed of pure SSZ-13 particles. Despite the pronounced bimodal size distribution of the synthesized SSZ-13 particles (FIG. 1A), it can be seen that smaller particles were selectively deposited on the $\alpha$-$Al_2O_3$ porous disc, forming a continuous seed layer. In particular, the particles that formed the seed layer had an average size of 0.40±0.13 µm (Table 1).

TABLE 1

| Samples | Seed particle size (µm) | Grain size (µm) | DRY $CO_2$ permeance × $10^7$ (mol · m$^{-2}$ · s$^{-1}$ · Pa$^{-1}$)[d] | DRY $CO_2/N_2$ SF[d] | WET $CO_2$ permeance × $10^7$ (mol · m$^{-2}$ · s$^{-1}$ · Pa$^{-1}$)[d] | WET $CO_2/N_2$ SF[d] | Ref. |
|---|---|---|---|---|---|---|---|
| SSZ-13_P | 0.27[a] ± 0.11<br>0.59[b] ± 0.23 | 2.94 ± 0.28 | 1.86 | 2.3 | 0.82 | 1.2 | [1] |
| SSZ-13_G | 0.39 ± 0.16 | N/A[c] | 1.43 | 4.6 | 0.37 | 10 | [2] |

TABLE 1-continued

| Samples | Seed particle size (μm) | Grain size (μm) | DRY $CO_2$ permeance × $10^7$ (mol · $m^{-2}$ · $s^{-1}$ · $Pa^{-1}$)$^d$ | DRY $CO_2$/ $N_2$ SF$^d$ | WET $CO_2$ permeance × $10^7$ (mol · $m^{-2}$ · $s^{-1}$ · $Pa^{-1}$)$^d$ | WET $CO_2$/$N_2$ SF$^d$ | Ref. |
|---|---|---|---|---|---|---|---|
| C_H | 0.40 ± 0.13 | 4.89 ± 1.76 | 2.94 | 2.9 | 0.98 | 1.3 | Present invention |
| RC_L | | 4.62 ± 1.15 | 1.54 | 4.8 | 0.53 | 8.3 | Present invention |

Reference 1. J.A. Mason et al., Energy Environ. Sci. 4 (2011) 3030-3040.
Reference 2. J.D. Figueroa et al., Int. J. Greenh. Gas Control 2 (2008) 9-20.
$^a$Particle size in the shortest dimension was measured.
$^b$Particle size in the longest dimension was measured.
$^c$The grains were not clearly defined for the estimation of grain sizes.
$^d$These performance values were obtained with respect to the equimolar $CO_2/N_2$ binary mixture at 30° C.

Figure 3:
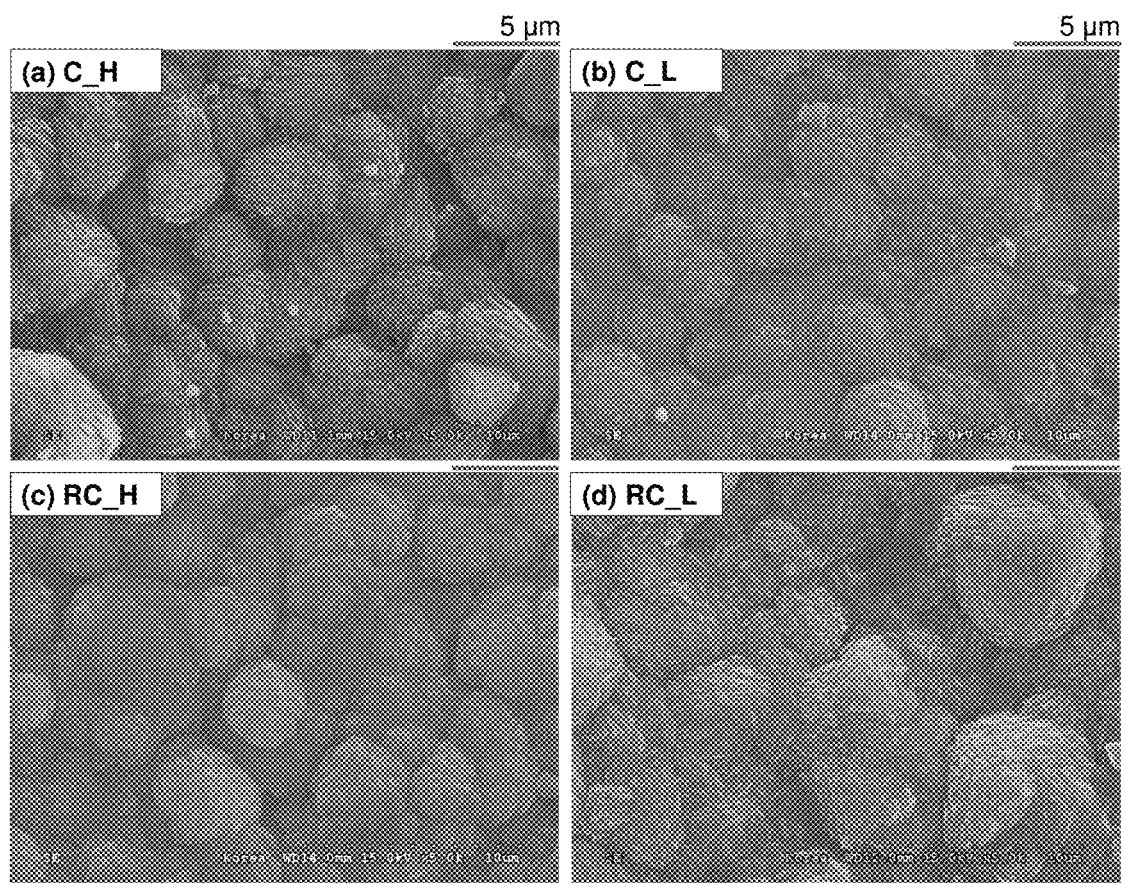
FIG. 3 shows top-view SEM images of (a) C_H, (b) C_L, (c) RC_H, and (d) RC_L according to an embodiment of the present invention.
Figure 4:
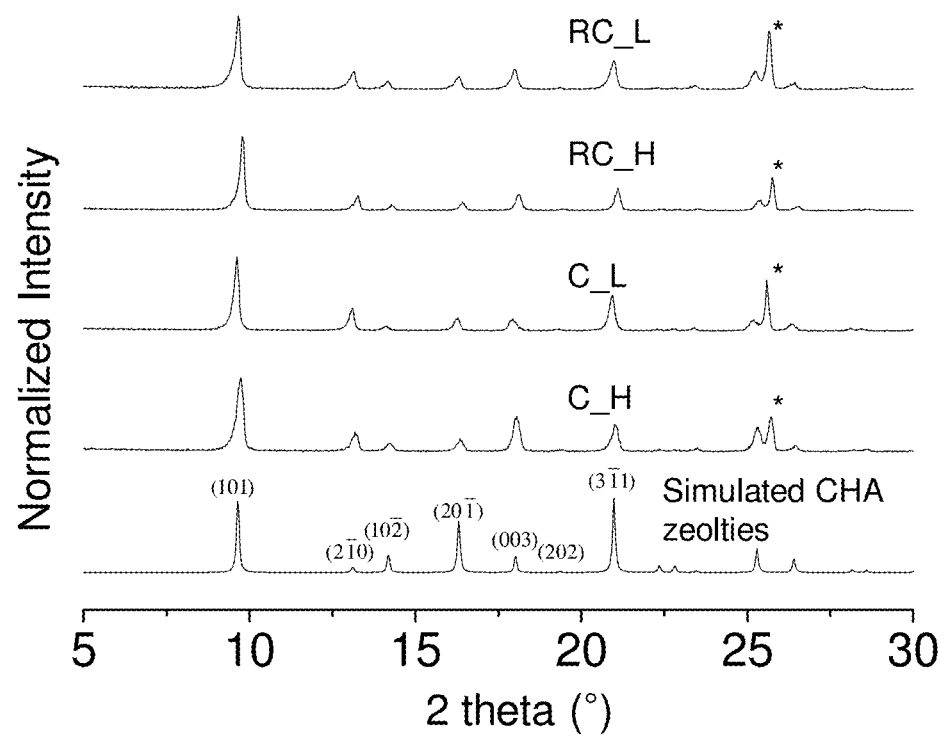
FIG. 4 shows XRD patterns of C_H, C_L, RC_H, and RC_L along with the simulated XRD pattern of silica CHA zeolites according to an embodiment of the present invention.
Figure 5:
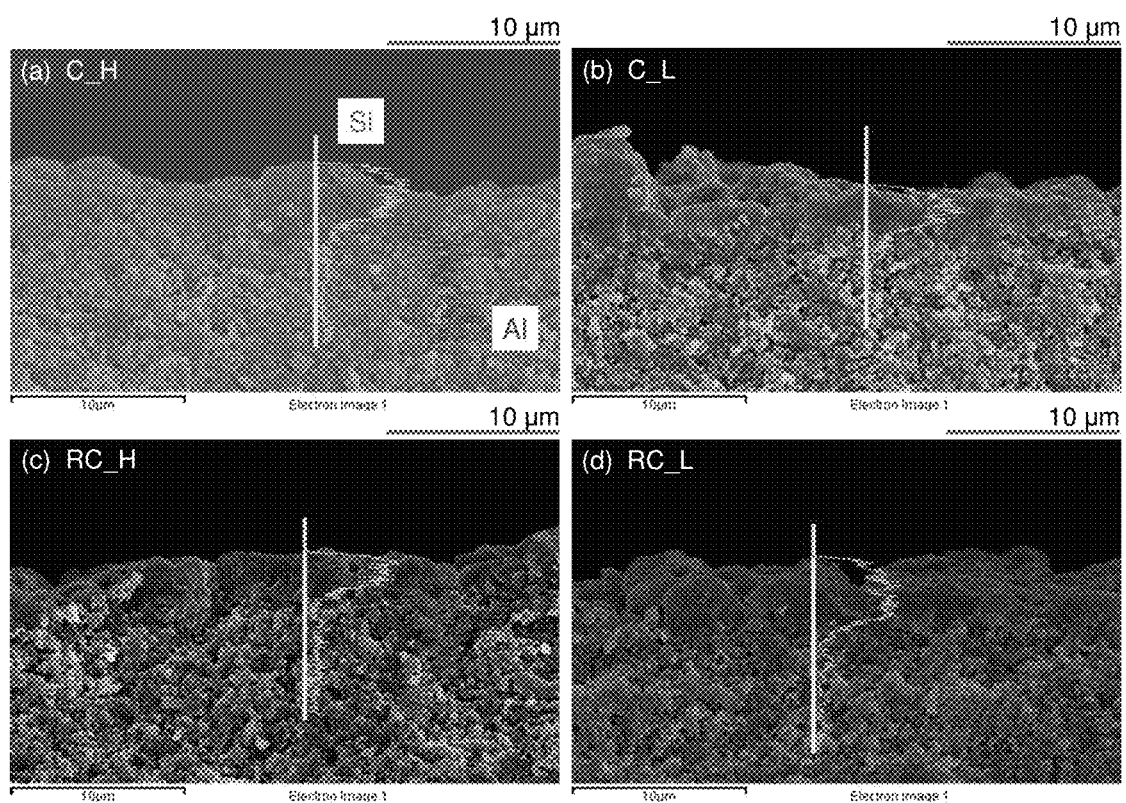
FIG. 5 shows cross-sectional view SEM images of (a) C_H, (b) C_L, (c) RC_H and (d) RC_L along with EDX analysis of the Si and Al compositions obtained along the yellow lines according to an embodiment of the present invention.

Subsequently, the hydrothermal growth of the seed layer led to the successful formation of continuous SSZ-13 membranes (FIGS. 2b-d and 3-4). Although four different heat treatments were applied to the same type of as-synthesized SSZ-13 film, the resulting top-view SEM images were indistinguishable from each other at SEM resolution (FIGS. 2b-c and 3). The membrane similarity is also indicated by their comparable XRD patterns (FIGS. 2d and 4). Of the membrane series considered in the present invention, the results for RC_L are shown in FIG. 2b-d. The SSZ-13 seed layer shown in FIG. 2a was well intergrown, having a final thickness of ~3 μm. The corresponding XRD pattern in FIG. 2d indicates a random orientation of RC_L, as observed for the other membranes (FIG. 4). In addition, the EDX analyses of all four membrane samples confirm the similar chemical compositions along the membrane thickness (FIG. 5). In particular, the Al content monotonically increased from the membrane surface toward the interface of the membrane and the α-$Al_2O_3$ disc, whereas the content of Si atoms was almost constant throughout the film thickness. This trend was consistent with the chemical profiles of SSZ-13 membranes fabricated using a synthetic precursor with a nominal Si/Al ratio of ~20 (E. Kim et al., Environ. Sci. Technol. 48 (2014) 14828-14836). A minor difference between the SSZ-13 membrane and the membrane of the previous study by the present inventors (E. Kim et al., Environ. Sci. Technol. 48 (2014) 14828-14836) was the use of the plate-like CHA particles as the seed layer constituent.

Figure 6:
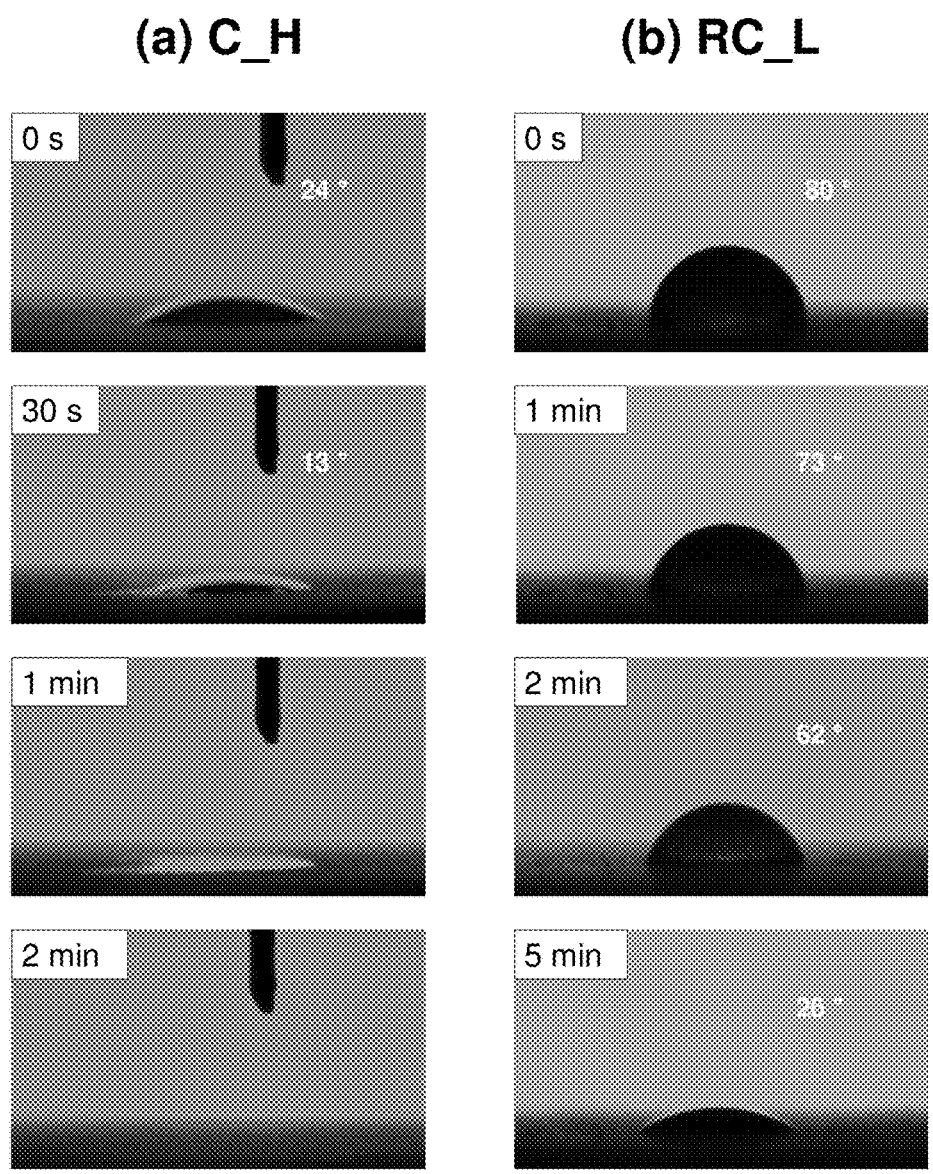
FIG. 6 shows contact angles of water droplets on (a) C_H and (b) RC_L as a function of time according to an embodiment of the present invention.

Furthermore, the contact angle was measured by dropping water droplets onto the surface of the membrane to evaluate the hydrophobicity of C_H and RC_L. FIG. 6 clearly shows that, even membranes obtained immediately after the same synthesis have distinct separation membrane characteristics (first contact angle: 80° for RC_L and 24° for C_H) under different heat treatments. In particular, RC_L can be considered to be hydrophobic, and was found to be comparable to the SSZ-13 membrane synthesized with a synthetic precursor having a nominal Si/Al ratio of ~100 in a previous study by the present inventors (Q. Sun et al., Renew. Sust. Energ. Rev. 51 (2015) 521-532). Furthermore, when water droplets are dropped on C_H from above, they are all absorbed by the separation membrane after 2 minutes, which means that a notable amount of defects is present in C_H. In contrast, although the droplets gradually spread over the surface, they still remain on the surface after 5 minutes. This strongly supports that RC_L has fewer defects than C_H.

Example 2: Permeation Properties Through SSZ-13 Membranes

All four membranes, having similar membrane properties, were further tested to evaluate the separation performance thereof with respect to equimolar $CO_2/N_2$ binary mixtures under both dry and wet conditions (FIGS. 7a-d and 8). First, neither of the conventionally calcined SSZ-13 membranes (C_H in FIG. 7a and C_L in FIG. 8a) provided good $CO_2$ permselectivities, having maximum $CO_2/N_2$ SFs at 30° C. of ~2.9 and ~4.4, respectively. In fact, the CHA membranes synthesized with a synthetic precursor at a Si/Al ratio of 20 in the previous study by the present inventors (D. Korelskiy et al., Materials for Energy and Sustainability 3 (2015) 12500-12506) showed very poor performance, indicating the importance of choosing an appropriate Si/Al ratio. Interestingly, neither membrane showed an improvement in separation performance in the wet feed; maximum $CO_2/N_2$ SFs of C_H (FIG. 7b) and C_L (FIG. 8b) were ~1.8 and ~3.6, respectively. These maximum $CO_2/N_2$ SFs were observed at ~75° C. for both C_H and C_L because the co-fed water vapor, which is capable of hindering the adsorption and diffusion of $CO_2$ in a complicated way, slightly decreased the permeance of $CO_2$ compared to lower temperatures of 30° C. and 50° C. Nevertheless, this result suggests the presence of pronounced non-zeolitic regions, i.e., defects in both C_H and C_L, and accordingly, the simple change in the calcination temperature of 450 or 550° C. did not mitigate the negative effects of the defects on the separation performance. In particular, the $CO_2$ permeance was significantly decreased, apparently because of the inhibitory effect of the adsorbed water molecules. In contrast, the $N_2$ permeance did not decrease as much, seemingly because the $N_2$ molecules were weakly adsorbed on the SSZ-13 membranes (external and internal surfaces) so that the additional adsorption of water molecules did not disfavor the transport of $N_2$ in the defective membrane (E. Kim et al., Environ. Sci. Technol. 48 (2014) 14828-14836).

Figure 7:
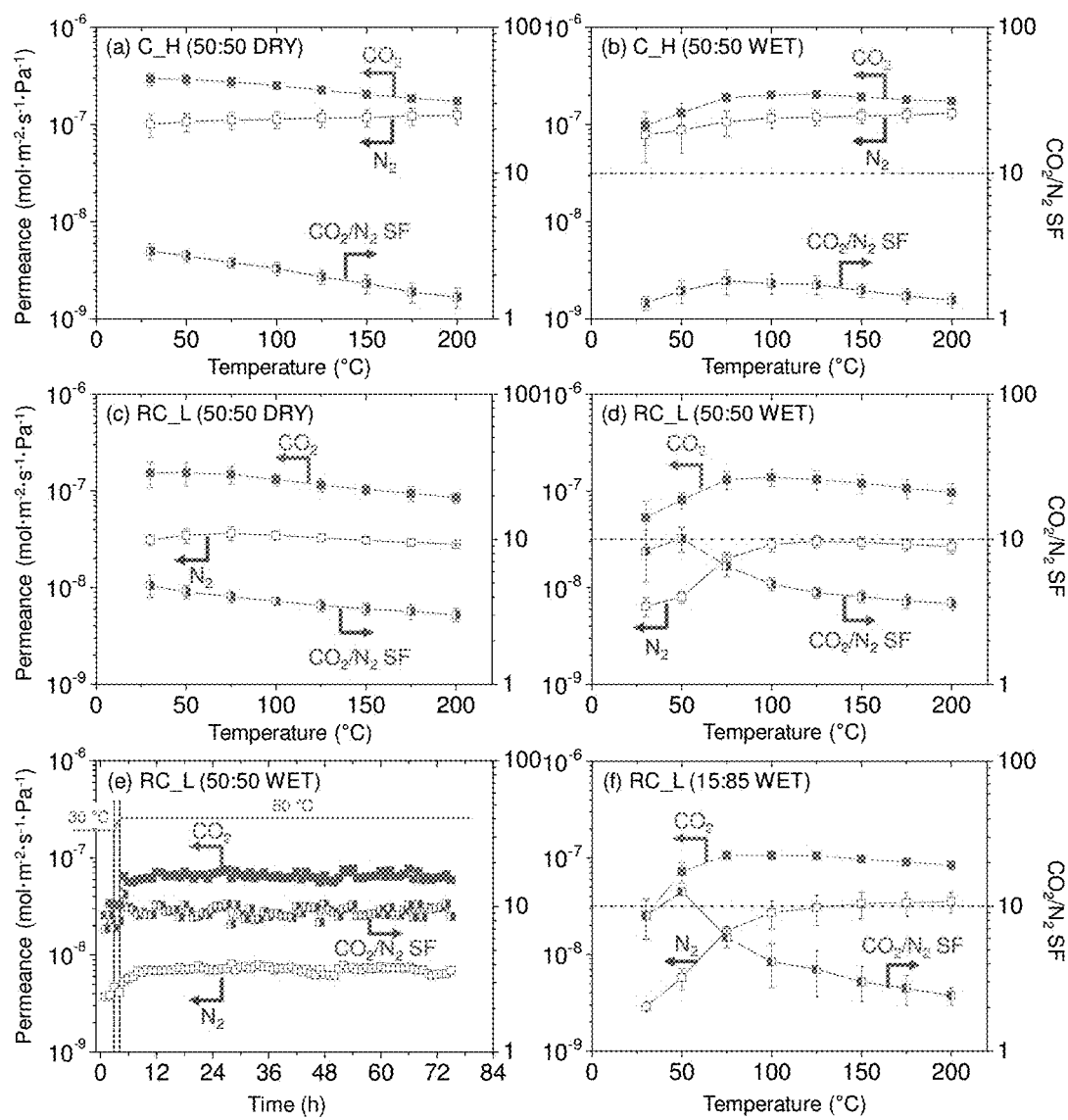
FIG. 7 shows the permeances of $CO_2$ and $N_2$ mixtures and $CO_2/N_2$ SFs corresponding thereto as a function of temperature, with respect to C_L and RC_H under (a)&(c) dry (50:50 DRY) and (b)&(d) wet (50:50 WET) conditions, respectively, (e) the results of a long-term stability test for the separation performance of RC_L at 50° C. under wet conditions (50:50 WET) for 3 days, and (f) the permeability of $CO_2$ and $N_2$ and the corresponding $CO_2/N_2$ SFs measured under flue gas conditions (15:85 WET) simulated through RC_L according to an embodiment of the present invention.
Figure 8:
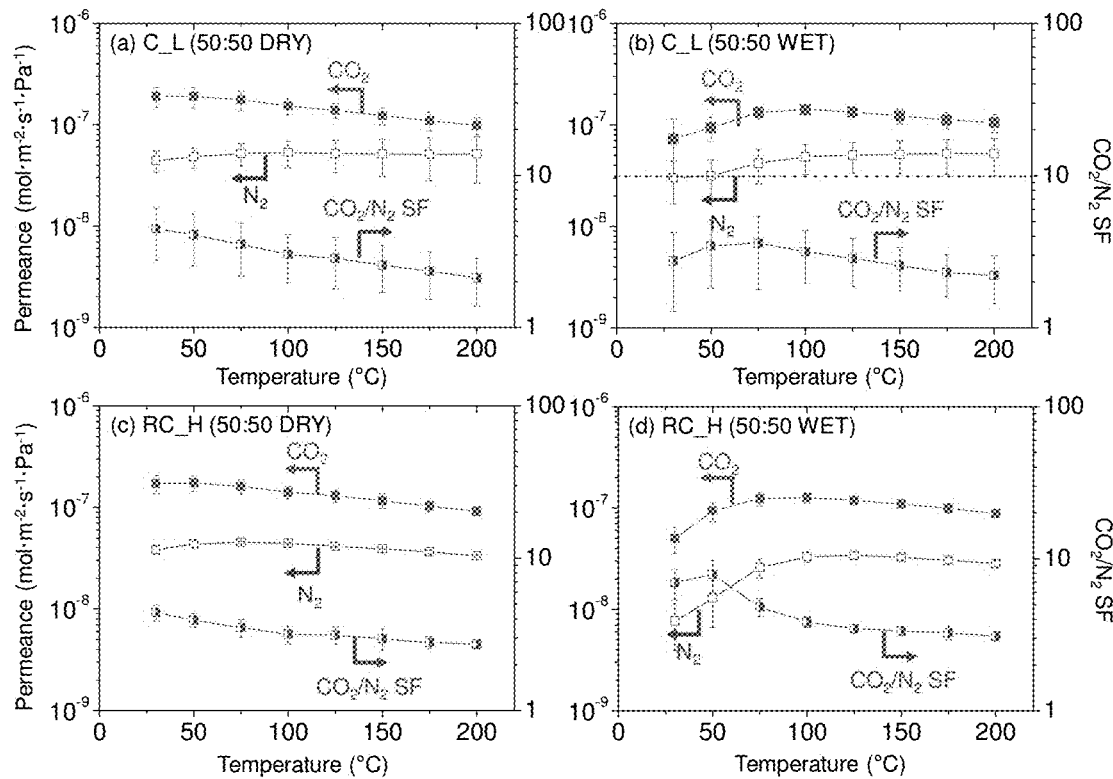
FIG. 8 shows permeances of $CO_2$ and $N_2$ and $CO_2/N_2$ SFs corresponding thereto as a function of temperature, with respect to C_L and RC_H under (a)&(c) dry (50:50 DRY) and (b)&(d) wet (50:50 WET) conditions, respectively, according to an embodiment of the present invention.

In contrast, RTP-treated SSZ-13 membranes (RC_L in FIG. 7c and RC_H in FIG. 8c) showed some improvement in the $CO_2$ permselectivities under dry conditions. Specifically, the corresponding maximum $CO_2/N_2$ SFs at 30° C. were ~4.8±0.8 for RC_L and ~4.4±0.5 for RC_H, which were a little higher than those of the counterparts calcined at the same temperatures (~4.4±1.7 for C_L and ~2.9±0.4 for C_H). This indicates that RTP altered the defect structure of the RTP-treated SSZ-13 membrane, apparently reducing the degree of defects. In particular, both RTP-treated membranes showed much improved maximum $CO_2/N_2$ SFs of ~10.1±2.0 for RC_L and ~7.9±1.9 for RC_H at 50° C. under wet conditions (FIGS. 7d and 8d), whereas the measured $CO_2/N_2$ SFs were ~3.5 for C_L and ~1.6 for C_H at the same temperature (FIGS. 8b and 7b). Interestingly, the maximum $CO_2/N_2$ SF was then observed at 50° C., not 30° C., because the $CO_2$ permeance was significantly decreased at 30° C., at which the adsorption of water molecules on and in the SSZ-13 zeolites was so strong that the corresponding inhibition of the transport of $CO_2$ molecules was pronounced. This temperature shift in the maximum $CO_2/N_2$ SF between dry and wet conditions is similar to that observed for the well-performing SSZ-13 membrane in a previous study by the present inventors (E. Kim et al., Environ. Sci. Technol. 48 (2014) 14828-14836). In this regard, this is the first time that RTP has been applied to SSZ-13 membranes for the purpose of improving the separation performance thereof.

One of the benefits of inorganic zeolites is the robustness thereof, and this is a requirement for reliable long-term application (N. Kosinov et al., J. Membr. Sci. 499 (2016) 65-79; B. Zhu et al., J. Membr. Sci. 453 (2014) 126-135; H. B. Wang et al., J. Membr. Sci. 450 (2014) 425-432). Thus, RC_L, which showed the best performance with respect to the wet feed (FIG. 7d) was further tested under wet conditions at 50° C. for 3 days to validate the suitability thereof for long-term use (FIG. 7e). As expected, RC_L exhibited steady $CO_2$ permselectivity, demonstrating its suitability for practical application. In addition, the performance of RC_L was evaluated with respect to a more realistic feed (15:85 WET), which was chosen to model the flue gas stream emitted from a coal-fired power plant (FIG. 7f). Notably, the performance of FIG. 7f was almost identical to that with respect to the feed gas of 50:50 WET of FIG. 7d. This linear response with respect to the change in the $CO_2$ partial pressure can be attributed to the almost linear adsorption behavior of $CO_2$ in SSZ-13 zeolites (E. Kim et al., Environ. Sci. Technol. 48 (2014) 14828-14836). In addition, linear results of the RTP-treated SSTP-13 membranes having $CO_2$ permselectivity show that the membranes are suitable for $CO_2$ separation in various fields such as those of flue gases (~3-4 vol % $CO_2$) from natural gas (R. W. Baker et al., Int. J. Greenh. Gas Control 66 (2017) 35-47; R. L. Siegelman et al., Energy Environ. Sci. (2019) Advance Article, 10.1039/C9EE00505F) or gas discharged (~20-40 vol % $CO_2$) from the steel and cement industry (R. W. Baker et al., Ind. Eng. Chem. Res. 57 (2018) 15963-15970; X. Z. He, Energy Sustain. Soc. 8 (2018) 14).

Figure 9:
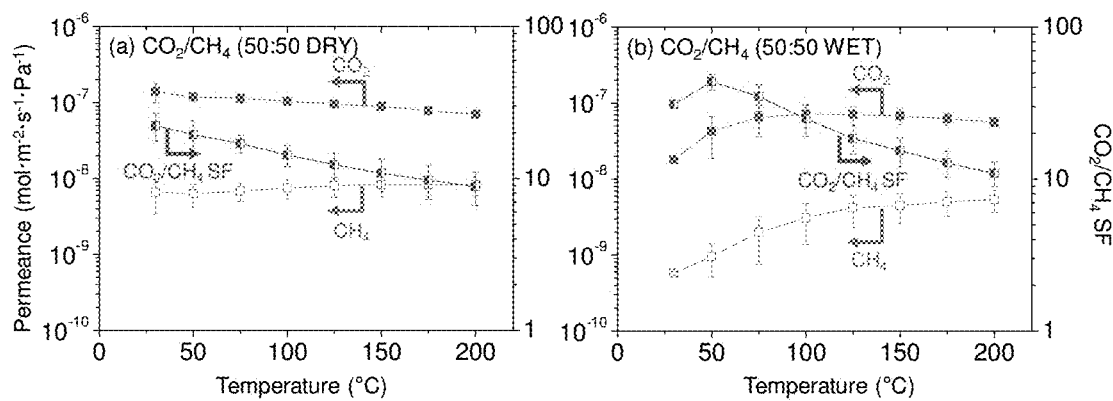
FIG. 9 shows permeances of $CO_2$ and $CH_4$, and $CO_2/CH_4$ SFs corresponding thereto, as a function of temperature, with respect to C_H and RC_L under (a) dry (50:50 DRY)

Along with the $CO_2/N_2$ mixture, RC_L was further evaluated for its ability to separate $CO_2$ from $CH_4$ under dry and wet conditions (FIG. 9). Because RC_L showed modest $CO_2/N_2$ separation performance (maximum $CO_2/N_2$ SF of 4.8) under dry conditions (FIG. 7c), it also showed modest $CO_2/CH_4$ separation performance; the maximum $CO_2/CH_4$ SF at 30° C. was ~19.4±4.6. In addition, it was noted that the maximum $CO_2/CH_4$ SF, which was desirably observed at 50° C. (a typical temperature of biogas exhaust gas), was much improved under wet conditions; i.e., $CO_2/CH_4$ SF of ~19.4±4.5 under dry conditions vs. ~43.7±5.1 under wet conditions. Apparently, the transport of the larger $CH_4$ molecule was significantly inhibited by the adsorbed water molecules.

In addition, how RC_L responded to different amounts of water vapor was evaluated in both $CO_2/N_2$ and $CO_2/CH_4$ separation processes (FIGS. 10a and 10c). For this purpose, the vapor pressure of $H_2O$ in the feed gas at 50° C. (representative temperature for both flue gas and biogas) was increased from 3 through 7 to 12 kPa. Although the $CO_2$ permeance decreased with increasing water vapor pressure in both cases, the degree of reduction in the permeance was pronounced for the slowly permeating $N_2$ and $CH_4$ components, resulting in a monotonic increase of $CO_2$ permselectivity with increasing water vapor pressure. Interestingly, the trend of reduced $CO_2$ permeance was similar to that of a hydrophobic CHA membrane (having an initial water contact angle of 80°) previously studied by the present inventors (M. Lee et al., ACS Appl. Mater. Interfaces 11 (2019) 3946-3960). Furthermore, the high separation performance of RC_L was well maintained at a saturated water vapor pressure of 12 kPa at 50° C. (FIGS. 10b and 10d). Even after RC_L was exposed to a much higher temperature of 200° C. for 2 days, it preserved its original $CO_2$ permselectivity for an additional 3 days at 50° C. for the separation of both $CO_2/N_2$ and $CO_2/CH_4$ (FIGS. 10b and 10d). This strongly indicates the robustness of SSZ-13 membranes for carbon capture processes because of the high chemical and thermal stabilities of inorganic zeolite membranes (D. Korelskiy et al., Materials for Energy and Sustainability 3 (2015) 12500-12506).

Example 3: Investigation of Defect Structure by FCOM

In addition to the $CO_2$ permselectivities of all four membrane samples, the non-zeolitic and defective structures of these samples were further investigated to understand the pronounced difference in $CO_2$ separation performance. For this purpose, among the four samples, C_H and RC_L, which showed the worst (FIG. 7b) and best (FIG. 7d) $CO_2/N_2$ performances, respectively, under wet conditions, were chosen. FIG. 11 shows the FCOM images of C_H and RC_L obtained after different dyeing durations of 12, 24 and 60 hours. For comparison, cross-sectional view and top-view SEM images are displayed together. First, C_H, which showed very poor $CO_2$ permselectivity, having a maximum $CO_2/N_2$ SF of 2.9 (FIG. 7a), had interconnected cracks after being dyed for 12 hours, and these cracks ran down to the interface of the SSZ-13 membrane and the $\alpha$-$Al_2O_3$ disc (FIG. 11a2-b2), as indicated by the yellow arrows in FIG. 11a2-a4. The crack features observed after 12-h dyeing were well preserved up to 60-h dyeing; in particular, the cracks that propagated down to the interface were easily observed, as indicated by the yellow arrows. In addition to the FCOM images, inset images of the dyeing process are shown in the cross-sectional view FCOM images in FIG. 11, and provided further information regarding the defects. Despite the similar crack features of C_H up to 60 hours, the images revealed that the dye molecules accessed more defects and even passed through the defects to the permeate side after 24 hours.

In contrast, RC_L did not show clear cracks after 12-h dyeing (FIG. 11c2-d2), although faint, thin cracks were visible. Dyeing for 24 hours revealed the crack features more clearly. These cracks, though not pronounced, propagated all the way down to the interface, as indicated by the yellow arrow in FIG. 11c3. Eventually, after dyeing for 60 hours, the cracks in RC_L were revealed, as shown in FIG. 11c4-d4, and the cracks were comparable to those in C_H in FIG. 11a4-b4. Nevertheless, the inset image in FIG. 11c4 confirms that significant amounts of the dye molecules did not pass through the defects in RC_L because the water in the bottom permeate side remained clear. This indicates that the degree of defects in RC_L was lower than that in C_H.

The FCOM technique distinguished the marked difference in the defect structures of the C_H and RC_L membranes (FIG. 11). In particular, the kinetic FCOM measurements obtained after dyeing for different durations indicate that RC_L and C_H had similar numbers of defects, but the size of the defects in C_H was much larger than in RC_L. Accordingly, RC_L showed better $CO_2/N_2$ separation performance; the maximum $CO_2/N_2$ SF was 4.8 (FIG. 7c) vs. 2.9 for C_H (FIG. 7a). Such a difference in the defect structures was reflected by the considerable discrepancy in the $CO_2/N_2$ separation performances of C_H and RC_L with respect to the wet feed gas (FIGS. 7b and 7d). It appears that the defect surfaces in RC_L were covered with physisorbed water molecules, and thus the intrinsic role of the SSZ-13 membrane was recovered (M. J. Diaz-Cabanas et al., Chem. Commun. (1998) 1881-1882; S. Hong et al., Chem. Mater. 30 (2018) 3346-3358). Indeed, the hydrophobicity of RC_L, which had an initial water contact angle of 80°, is desirable for securing high $CO_2$ permselectivities seemingly via effective defect blocking by adsorbed water molecules. In contrast, the defect size of C_H was too large for the physisorption of water molecules in this way to achieve a favorable $CO_2$ separation performance.

Example 4: Quantitative Understanding of Effect of Defects on $CO_2/N_2$ Separation Performance The degree of defects was further quantified by performing image processing on the FCOM images of C_H and RC_L shown in FIGS. 11 and 12. This analysis is useful for separating the contributions of the zeolitic and defective parts to the final permeation rate of $CO_2$ molecules shown in FIGS. 7A and 7C. Specifically, the extracted quantitative properties (mainly the area fraction and tortuosity) of the defect structures present in the two types of membranes were complemented by the modeling of the molecular transport across the defect-containing zeolite membrane (S. Hong et al., Chem. Mater. 30 (2018) 3346-3358). The resulting properties relevant to the defect structure are summarized in Table 2, and the schematic defect structures were reconstructed by performing image processing on the FCOM images (FIG. 13). In addition, FIG. 14 summarizes the porosities of the zeolitic and defective parts and their contribution to the final $CO_2$ permeation rate. In the present invention, the method of measuring the defect size of SSZ-13 has been improved. In an attempt to predict the intrinsic permeability of the separation membrane, the permeation amount of $CO_2$ or $N_2$ in the dyed SSZ-13 membrane assuming no defects in the literature (S. Hong et al., Chem. Mater. 30 (2018) 3346-3358) was constantly increased, and for each situation, the size of the defect was predicted by analyzing the difference between the measured permeation amount and the theoretical permeation amount of C_H and RC_L. At this time, it was assumed that the permeability of both $CO_2$ and $N_2$ through the defect relates to Knudsen diffusion. As a result, curves for the defect sizes of C_H and RC_L were obtained as a function of the increased $CO_2$ or $N_2$ permeation rate for the SSZ-13 membranes treated with the aforementioned dyeing (FIGS. 15A-B). For C_H and RC_L, the porosity of the defect corresponding to each defect size and the permeability of $CO_2$ or $N_2$ passing through the defect can be calculated (FIGS. 15C-D). The final defect size for C_H and RC_L was determined at the intersection of the two curves (indicated by the black box in FIGS. 15a-b), and the porosity of the corresponding defects and the permeability of $CO_2$ and $N_2$ through the defects are shown in FIG. 14. Detailed information on the defect structure of C_H and RC_L (FIG. 14) is summarized in Table 2. Although the porosity and degree of defects of C_H and RC_L are similar, the difference in defect size (~3.9 nm for C_H and ~2.2 nm for RC_L) explains other contributions to the final $CO_2$ permeability. Indeed, according to FIG. 7A, the large defect size of C_H, which has very poor performance, is key to providing as much as 16%, as opposed to ~8%, of the undesirable path in RC_L (FIG. 14). Subsequently, the approach for predicting defect sizes in the present invention will compare and supplement the permporometry method used to characterize the defect structure (D. Korelskiy., J. Mater. Chem. A 5 (2017) 7295-7299; S. Karimi et al., J. Membr. Sci. 489 (2015) 270-274).

The structures and properties of the zeolite membranes are a function of combining the components of the synthetic solution with the molar ratio thereof (e.g., Si/Al ratio). Therefore, considerable effort is required in order to find optimal synthesis conditions so as to fabricate a high-performance zeolite separation membrane. Although the RTP method does not improve all types of poor zeolite separation membranes, this method can be considered as one of reliable approaches to alter the defect structures and improve the performance of the separation membranes.

TABLE 2

Detailed information of defect structures in C_H and RC_L obtained by performing image processing on FCOM results.

| Membrane samples | Nominal Si/Al ratio in the synthetic solution | Tortuosity (z-direction) | Area fraction[a] | Size of defect (nm) | Porosity (%)[c] | $CO_2$ molar flux through zeolitic pores (mmol · $m^{-2}$ · $s^{-1}$)[d] | $CO_2$ molar flux through defects (mmol · $m^{-2}$ · $s^{-1}$)[d] | $N_2$ molar flux through zeolitic pores (mmol · $m^{-2}$ · $s^{-1}$)[d] | $N_2$ molar flux through defects (mmol · $m^{-2}$ · $s^{-1}$)[d] | Reference |
|---|---|---|---|---|---|---|---|---|---|---|
| SSZ-13_P | 20 | 1.35 | 0.054 | 2.8 | 0.19 | 6.7 | 2.5 | 0.58 | 3.5 | [1] |
| SSZ-13_G | 100 | 1.10 | 0.069 | 1.8 | 0.15 | 5.9 | 0.8 | 0.48 | 1.1 | [2] |
| C_H | 20 | 1.12 | 0.030 | 3.9 | 0.14 | 12.4 | 2.4 | 1.1 | 4.1 | Present invention |
| RC_L | 20 | 1.38 | 0.033 | 2.2 | 0.09 | 7.9 | 0.7 | 0.66 | 1.0 | Present invention |

Reference 1. M. Lee et al., ACS Appl. Mater. Interfaces 11 (2019) 3946-3960.
Reference 2. S. Hong et al., Chem. Mater. 30 (2018) 3346-3358.
[a]The area fraction of the defects was obtained by dividing the number of defective pixels by the total number of pixels in an FCOM image.
[b]The molar fluxes of $CO_2$ and $N_2$ of the dye-treated SSZ-13 separation membrane, which assumed no defect, was continuously increased until the same defect size was obtained (detailed information is mentioned in FIG. 15).
[c]The porosity of the defects was obtained by multiplying the size of defects, area fraction, and correction factor. The correction factor is the inverse of pixel resolution, and is $1/80$ $nm^{-1}$ in the present invention.
[d]The molar fluxes through the zeolitic pores and defects were based on the measurements of a membrane sample with respect to the dry equimolar $CO_2/N_2$ binary mixture at 30° C., as given in FIGS. 7a (for C_H) and 7c (for RC_L).

Example 5: Comparison of Separation Performance with Literature Data

Finally, the $CO_2/N_2$ and $CO_2/CH_4$ separation performances of the RC_L membrane were compared with those of zeolite membranes reported in the literature. For a fair comparison, in FIG. 16, the present inventors attempted to determine only the $CO_2/N_2$ and $CO_2/CH_4$ separation performance of zeolite membranes tested with respect to both dry and wet feed gas at ~40 to 50° C. First, the hydrophilic NaY membrane showed very poor $CO_2/N_2$ separation performance under wet conditions (FIG. 16a), apparently because of the strong adsorption of water molecules in NaY zeolites, thus significantly inhibiting the transport of $CO_2$ molecules across the membrane. In contrast, hydrophobic RC_L showed much improved $CO_2/N_2$ SFs, from 4.8 under dry conditions to 10.1 under wet conditions. In particular, it was noted that RC_L showed performance comparable to those of other zeolite membranes under wet conditions. This supports the beneficial role of RTP in reducing the defect size and thus improving separation performance. Otherwise, the corresponding separation performance was very poor, as seen for C_H (FIG. 7a-b) and C_L (FIG. 16a-b).

This trend was also observed for the $CO_2/CH_4$ separation performance (FIG. 16b). Although RC_L did not show a very high $CO_2/CH_4$ SF (~19.4) at 50° C. under dry conditions, the addition of water vapor to the feed gas led to increased $CO_2/CH_4$ SF (~43.7). This also supports the beneficial role of RTP in reducing the defect size, and the resulting performance was comparable to that of other zeolite membranes (FIG. 16b). This indicates desirable hydrophobicity of the SSZ-13 membranes in the present invention, as long as defects thereof are controlled; in particular, either defect density or size should be decreased.

The present invention demonstrated that the defect structure of hydrophobic SSZ-13 membranes can be controlled using RTP, specifically, the defect size was effectively decreased. Compared to conventionally calcined SSZ-13 membranes, the resulting RTP-treated SSZ-13 membrane showed markedly improved $CO_2$ permselectivities with respect to both $CO_2/N_2$ and $CO_2/CH_4$ mixtures; maximum $CO_2/N_2$ and $CO_2/CH_4$ SFs of 4.8 and 22.2 at 30° C. More preferably, this RTP-treated SSZ-13 membrane provided much improved maximum $CO_2/N_2$ (10.1) and $CO_2/CH_4$ (43.7) SFs at 50° C. (a representative temperature of flue gas and biogas exhaust streams) in the presence of the wet feed gas. This strongly indicates that by appropriately controlling the defect structure to reduce the effect thereof on separation performance, the corresponding less-defective SSZ-13 membranes can achieve high $CO_2$ permselectivities, even in the presence of water vapor in the feed gas.

INDUSTRIAL APPLICABILITY

The present invention can effectively reduce the size of defects in a hydrophobic separation membrane, thereby exhibiting excellent $CO_2$ permselectivity for $CO_2/N_2$ and $CO_2/CH_4$ mixtures compared to a separation membrane calcined by a conventional method.

Particularly, the separation membrane according to the present invention has much improved maximum $CO_2/N_2$ and $CO_2/CH_4$ SF under wet conditions and has high $CO_2$ permselectivity despite the presence of water in the feed gas, thereby obtaining a CHA zeolite separation membrane having high $CO_2/N_2$ and $CO_2/CH_4$ separation performance.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method of preparing a CHA zeolite separation membrane having a controlled size of defects, comprising:
   (a) adding a support having a CHA particle seed layer deposited thereon to a synthetic solution for zeolite growth containing an organic structure directing agent and Si and Al as raw materials, and then conducting hydrothermal synthesis;
   (b) conducting rapid calcination at a temperature of 700 to 1,200° C. for 10 seconds to 5 minutes after hydrothermal synthesis; and
   (c) conducting low-temperature calcination by slow calcination of heating at a temperature of 450 to 550° C. at a ramp rate of 0.1 to 5° C./min for 12 to 100 hours.

2. The method of preparing a CHA zeolite separation membrane of claim 1, wherein a molar ratio of Si/Al is 5 to 1000.

3. The method of preparing a CHA zeolite separation membrane of claim 1, wherein the support comprises at least one selected from the group consisting of alumina, polypropylene, polyethylene, polytetrafluoroethylene, polysulfone, polyimide, silica, glass, mullite, zirconia, titania, yttria, ceria, vanadia, silicon, stainless steel and carbon.

4. The method according to claim 1, wherein the organic structure directing agent comprises one or more selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCI (N,N,N-trimethyl adamantylammonium chloride), TMAdaI(N,N,N-trimethyl adamantylammonium iodide), TEAOH (tetraethylammonium hydroxide), TEABr (tetraethylammonium bromide), TEAF (tetraethylammonium fluoride), TEACI (tetraethylammonium chloride), TEA! (tetraethylammonium iodide) and cyclohexylamine.

5. The method of preparing a CHA zeolite separation membrane of claim 1, wherein the synthetic solution for zeolite growth has a molar ratio of TMAdaOH: SiO2: $H_2O$: $Na_2O$: $Al_2O_3$ of 1 to 100: 100: 1000 to 20000: 0.5 to 50:0 to 10.

6. A CHA zeolite separation membrane having a controlled size of defects, produced by the method of claim 1.

7. A method of separating $CO_2$ from a mixture containing $CO_2$ and a molecule selected from the group consisting of $CH_4$, $N_2$, $O_2$, $O_2H_4$, $O_2H_6$, $O_3H_6$ and $O_3H_8$ using the CHA zeolite separation membrane of claim 6.

8. The method of separating $CO_2$ of claim 7, wherein the separation is performed at a temperature of 30 to 200° C. under dry conditions and at a temperature of 30 to 200° C. under wet conditions.

9. A method of preparing a CHA zeolite separation membrane having a controlled size of defects, comprising:
   (a) adding a support having a CHA particle seed layer deposited thereon to a synthetic solution for zeolite growth containing an organic structure directing agent and Si and Al as raw materials, and then conducting hydrothermal synthesis;
   (b) conducting rapid calcination at a temperature of 700 to 1,200° C. for 10 seconds to 5 minutes after hydrothermal synthesis; and (c) conducting low-temperature calcination by heating at a temperature of 450 to 550° C., wherein the synthetic solution for zeolite growth has a molar ratio of TMAdaOH: $SiO_2$: $H_2O$: $Na_2O$: $Al_2O_3$ of 1 to 100: 100: 1000 to 20000: 0.5 to 50: 0 to 10.

10. The method of preparing a CHA zeolite separation membrane of claim 9, wherein a molar ratio of Si/Al is 5 to 1000.

11. The method of preparing a CHA zeolite separation membrane of claim 9, wherein the support comprises at least one selected from the group consisting of alumina, polypropylene, polyethylene, polytetrafluoroethylene, polysulfone, polyimide, silica, glass, mullite, zirconia, titania, yttria, ceria, vanadia, silicon, stainless steel and carbon.

12. The method according to claim 9, wherein the organic structure directing agent comprises one or more selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCI (N,N,N-trimethyl adamantylammonium chloride), TMAdaI(N,N,N-trimethyl adamantylammonium iodide), TEAOH (tetraethylammonium hydroxide), TEABr (tetraethylammonium bromide), TEAF (tetraethylammonium fluoride), TEACI (tetraethylammonium chloride), TEA! (tetraethylammonium iodide) and cyclohexylamine.

13. A CHA zeolite separation membrane having a controlled size of defects, produced by the method of claim 9.

14. A method of separating $CO_2$ from a mixture containing $CO_2$ and a molecule selected from the group consisting of $CH_4$, $N_2$, $O_2$, $O_2H_4$, $O_2H_6$, $O_3H_6$ and $C_3H_8$ using the CHA zeolite separation membrane of claim 13.

15. The method of separating $CO_2$ of claim 14, wherein the separation is performed at a temperature of 30 to 200° C. under dry conditions and at a temperature of 30 to 200° C. under wet conditions.

* * * * *